(12) United States Patent
Zhang et al.

(10) Patent No.: US 11,384,894 B2
(45) Date of Patent: Jul. 12, 2022

(54) ADJUSTMENT STRUCTURE, ADJUSTMENT METHOD THEREFOR, SEALING MEMBER, COAXIAL CABLE, GIMBAL, AND MOBILE APPARATUS

(71) Applicant: SZ DJI TECHNOLOGY CO., LTD., Shenzhen (CN)

(72) Inventors: Zhiyuan Zhang, Shenzhen (CN); Liang Li, Shenzhen (CN); Zhenhua Xu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/148,866

(22) Filed: Jan. 14, 2021

(65) Prior Publication Data

US 2021/0131608 A1 May 6, 2021

Related U.S. Application Data

(63) Continuation of application No. PCT/CN2019/107361, filed on Sep. 23, 2019.

(51) Int. Cl.
*G03B 17/56* (2021.01)
*F16M 11/12* (2006.01)
(Continued)

(52) U.S. Cl.
CPC ........... *F16M 11/123* (2013.01); *F16M 11/18* (2013.01); *F16M 13/04* (2013.01); *F16M 2200/041* (2013.01); *G03B 17/561* (2013.01)

(58) Field of Classification Search
CPC ........ F16M 11/00; F16M 11/02; F16M 11/04; F16M 11/043; F16M 11/045;
(Continued)

(56) References Cited

U.S. PATENT DOCUMENTS

2017/0174362 A1 6/2017 Zhao et al.
2018/0149949 A1 5/2018 Kim et al.

FOREIGN PATENT DOCUMENTS

CN 201937731 U 8/2011
CN 202144911 U 2/2012
(Continued)

OTHER PUBLICATIONS

International Search Report of PCT/CN2019/107361 (dated Mar. 3, 2020).

*Primary Examiner* — Clayton E. LaBalle
*Assistant Examiner* — Fang-Chi Chang
(74) *Attorney, Agent, or Firm* — Fideli Law PLLC

(57) ABSTRACT

An adjustment structure and an adjustment method therefor, a sealing member, a coaxial cable, a gimbal and a mobile apparatus are provided. The arm adjustment structure includes a base, an arm, and a sealing member. The arm is capable of moving relative to the base, and a clearing slot is disposed on the arm. The sealing member is disposed between the base and the arm, and is capable of being located at the clearing slot to cover the clearing slot. The sealing member is disposed between the base and the arm, and capable of being located at the clearing slot to cover the clearing slot to prevent the clearing slot from being exposed, and prevent foreign matters such as water droplets, sand, and dust from entering the gimbal through the clearing slot and affecting normal use of the gimbal.

19 Claims, 9 Drawing Sheets

(51) Int. Cl.
*F16M 11/18* (2006.01)
*F16M 13/04* (2006.01)

(58) Field of Classification Search
CPC .... F16M 11/046; F16M 11/048; F16M 11/06; F16M 11/12; F16M 11/121; F16M 11/123; F16M 11/18; F16M 11/20; F16M 11/2007; F16M 11/2035; F16M 11/2042; F16M 11/205; F16M 11/2085; F16M 11/2092; F16M 13/00; F16M 13/005; F16M 13/02; F16M 13/027; F16M 13/04; F16M 2200/00; F16M 2200/06; F16M 2200/066; F16M 2200/068; F16M 2200/041; G03B 17/56; G03B 17/561; G03B 17/563; G03B 17/566; G08B 13/19617; G08B 13/19623; G08B 13/1963; G08B 13/19632
See application file for complete search history.

(56) References Cited

FOREIGN PATENT DOCUMENTS

| | | | |
|---|---|---|---|
| CN | 105864606 A | 8/2016 | |
| CN | 107396529 A | 11/2017 | |
| CN | 206723742 U | 12/2017 | |
| CN | 207473168 A | 6/2018 | |
| CN | 109263476 A | 1/2019 | |
| CN | 110209199 A | 9/2019 | |
| DE | 202011103380 U1 | 8/2011 | |
| KR | 101595015 B1 | 2/2016 | |
| WO | WO-2018076136 A1 * | 5/2018 | ............. B64D 47/08 |

* cited by examiner

ADJUSTMENT STRUCTURE, ADJUSTMENT METHOD THEREFOR, SEALING MEMBER, COAXIAL CABLE, GIMBAL, AND MOBILE APPARATUS

RELATED APPLICATIONS

This application is a continuation application of PCT application No. PCT/CN2019/107361, filed on Sep. 23, 2019, and the content of which is incorporated herein by reference in its entirety.

TECHNICAL FIELD

This disclosure relates to the technical field of photographing device accessories, and specifically, to an adjustment structure, an adjustment method therefor, a sealing member, a coaxial cable, a gimbal, and a mobile apparatus.

BACKGROUND

An adjustable arm has an open structure in consideration of a wiring clearance problem. In a practical application, dust and water may enter the structure; and especially when the adjustable arm is applied to a gimbal with an adjustable centroid, normal use of the gimbal may be affected, and potential troubles may be caused to the normal operation of the gimbal.

SUMMARY

In light of the foregoing, to solve at least one of the above technical problems, it is necessary to provide an adjustment structure, an adjustment method therefor, a sealing member, a coaxial cable, a gimbal, and a mobile apparatus.

An arm adjustment structure includes: a base; an arm, which is movable relative to the base and includes a clearing slot; and a sealing member, which is disposed between the base and the arm, and is figured to locate at the clearing slot to cover the clearing slot.

An adjustment method for an arm adjustment structure includes: moving an arm relative to a base to adjust the arm to a preset position relative to the base, wherein, the arm adjustment structure includes the base, the arm which is movable relative to the base and includes a clearing slot, and a sealing member which is disposed between the base and the arm and figured to locate at the clearing slot; and positioning the sealing member on the arm to cover the clearing slot.

A coaxial cable for an arm adjustment structure includes: a coaxial cable body; and a bending portion connected to the coaxial cable body, where the arm adjustment structure includes a base includes a base body, and an arm movable relative to the base, wherein a clearing slot is disposed on the arm, and the bending portion bends in a moving direction of the arm relative to the base.

Compared with the existing technology, this disclosure has the following beneficial technical effects: the arm is movable relative to the base, so that the centroid of the gimbal may be adjusted to adapt to a variety of different types of loads such as lidar and multi-spectral cameras. While realizing the adjustable centroid of the gimbal, the sealing member is disposed between the base and the arm, and is capable of being located at the clearing slot to cover the clearing slot. The sealing member is disposed between the base and the arm, and the sealing member is capable of being located at the clearing slot to cover the clearing slot to prevent the clearing slot from being exposed, and prevent foreign matters such as water droplets, sand, and dust from entering the gimbal through the clearing slot and affecting normal use of the gimbal. Therefore, the sealing member provided may improve use reliability of the gimbal.

BRIEF DESCRIPTION OF THE DRAWINGS

The foregoing and/or additional aspects and advantages of this disclosure will become more apparent and comprehensible in the description for the embodiments in combination with the accompanying drawings.

Figure 1:
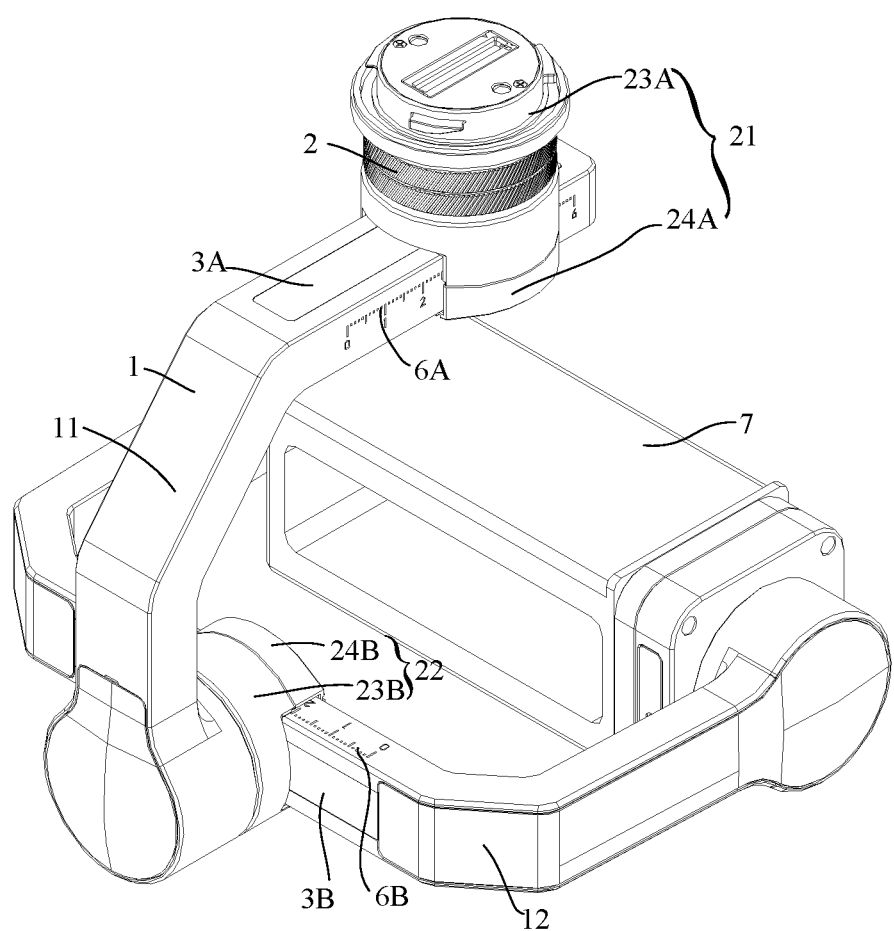
FIG. 1 is a schematic structural diagram of a gimbal according to some exemplary embodiments of this disclosure.

A correspondence between reference numerals and names of components in FIG. 1 to FIG. 6 is as follows:

1. arm; 11. yaw axle arm; 12. roll axle arm; 13A/B. clearing slot; 14A/B. mounting slot; 2. base; 21. yaw axle base; 22. roll axle base; 23A/B. base body; 24A/B. base cover; 25A/B. positioning protrusion; 3A/B. sealing member; 31A/B. through hole; 32A/B. positioning hole; 4A/B. sealing gasket; 5. coaxial cable; 51. coaxial cable body; 511. first connection segment; 512. second connection segment; 52. bending portion; 521. first bending segment; 522. second bending segment; 523. transition segment; 6A/B. scale line; 7. load; 8. screw; 9A/B. adhesive; 101. first electrical connection member; and 102. second electrical connection member.

DETAILED DESCRIPTION

To make the objects, features, and advantages of this disclosure more comprehensible, the following further describes this disclosure in detail with reference to accompanying drawings and specific embodiments. It should be noted that under a condition that no conflict occurs, the embodiments of this disclosure and features in the embodiments may be combined with each other.

Many specific details are described in the following description for fully understanding this disclosure. However, this disclosure may be further implemented in other manners different from this one described herein. Therefore, the scope of protection of this disclosure is not limited by the following disclosed specific embodiments.

Referring to FIG. 1 to FIG. 10, the following describes an arm adjustment structure, an adjustment method for the arm adjustment structure, a sealing member, a method for mounting the sealing member, a coaxial cable, a gimbal, and a mobile apparatus according to some embodiments of this disclosure.

The following describes some exemplary embodiments of a first aspect of this disclosure.

The embodiment of the first aspect of this disclosure provides an arm adjustment structure, including a base 2, an arm 1, and a sealing member 3. The arm adjustment structure is used for a gimbal. The gimbal includes at least one axis. The base 2 includes an axle base, and the arm 1 includes an axle arm. Certainly, the arm adjustment structure may also be applied to any other occasion where a position of an arm needs to be adjusted, and this is not limited herein. An axle arm adjustment structure of a gimbal is used only as an example.

The arm 1 is capable of moving relative to the base 2, and a clearing slot 13 is disposed on the arm 1. The sealing member 3 is disposed between the base 2 and the arm 1, and is capable of being located at the clearing slot 13 to cover the clearing slot 13.

The arm 1 is capable of moving relative to the base 2, so that a centroid of the gimbal may be adjusted to adapt to a variety of different types of loads 7 such as a lidar and a multispectral camera. While the centroid of the gimbal is made adjustable, the sealing member 3 is disposed between the base 2 and the arm 1, and the sealing member 3 is capable of being located at the clearing slot 13 to cover the clearing slot 13, so as to prevent the clearing slot 13 from being exposed and prevent foreign matters such as water droplets, sand, and dust from entering the gimbal through the clearing slot 13 and affecting normal use of the gimbal. Therefore, the sealing member 3 has waterproof and dustproof functions, improves use reliability of the gimbal, and has a low implementation cost.

Figure 2:
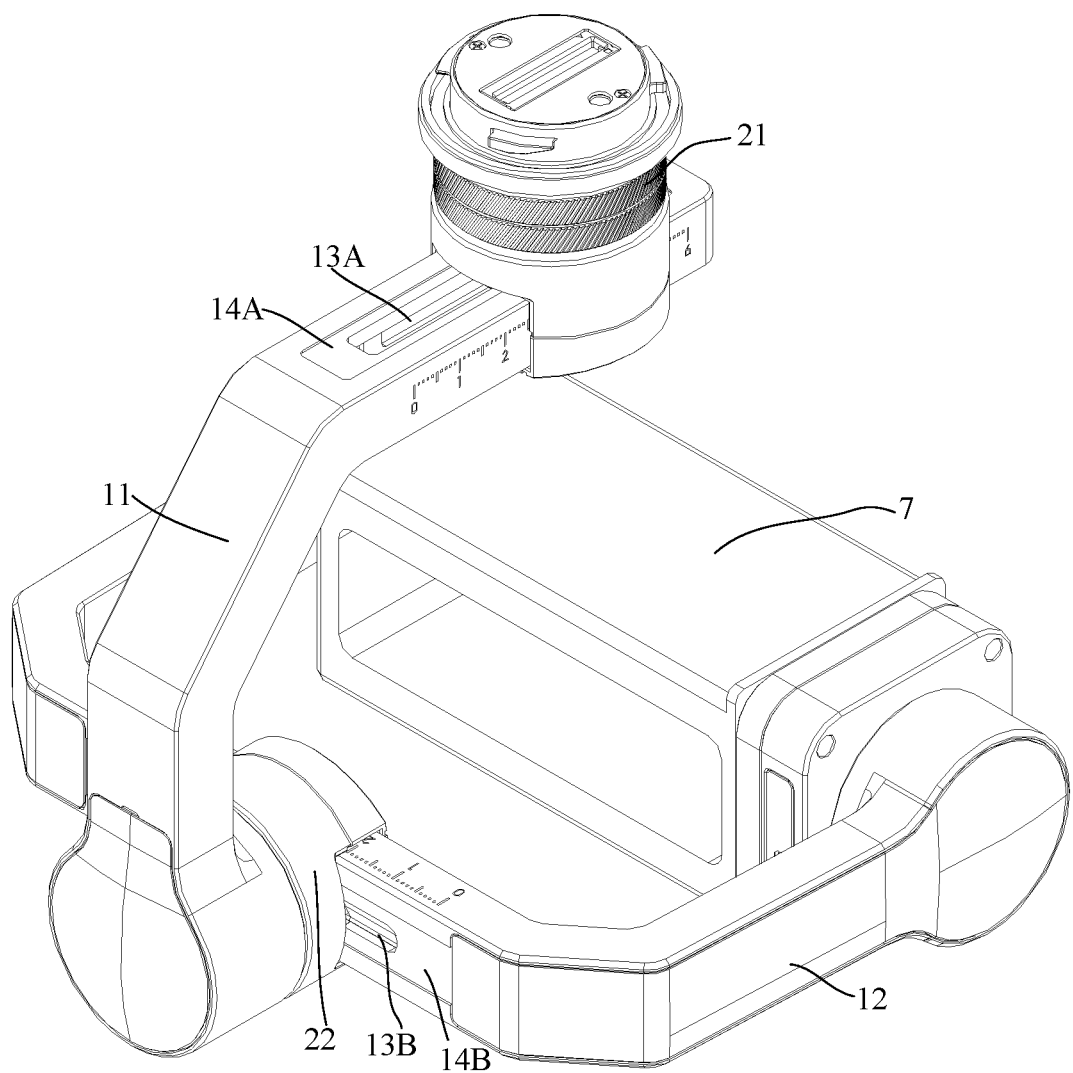
FIG. 2 is a partial schematic structural diagram of a gimbal according to some exemplary embodiments of this disclosure.

As shown in FIG. 1 and FIG. 2, the gimbal includes two axes. The base 2 includes a yaw axle base 21 and a roll axle base 22, and the arm 1 includes a yaw axle arm 11 and a roll axle arm 12. The yaw axle arm 11 is movable relative to the yaw axle base 21, and a clearing slot 13A is disposed on the yaw axle arm 11. A sealing member disposed between the yaw axle arm 11 and the yaw axle base 21 is a sealing member 3A, and the sealing member 3A is capable of being located at the clearing slot 13A to cover the clearing slot 13A. The roll axle arm 12 is movable relative to the roll axle base 22, and a clearing slot 13B is disposed on the roll axle arm 12. A sealing member disposed between the roll axle arm 11 and the roll axle base 21 is a sealing member 3B, and the sealing member 3B is capable of being located at the clearing slot 13B to cover the clearing slot 13B. To conveniently measure the motion of the yaw axle arm 11 relative to the yaw axle base 21, a scale line 6A is provided on the yaw axle arm 11. To conveniently measure the motion of the roll axle arm 12 relative to the roll axle base 22, a scale line 6B is provided on the roll axle arm 12.

Figure 3:
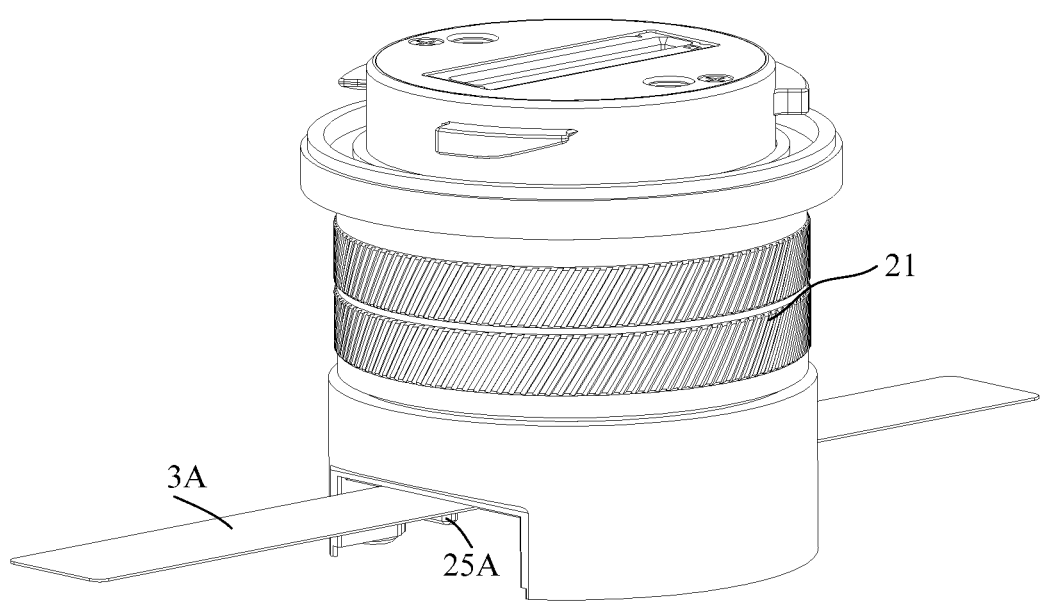
FIG. 3 is a schematic structural diagram of an axle base and sealing member assembled according to some exemplary embodiments of this disclosure.
Figure 4:
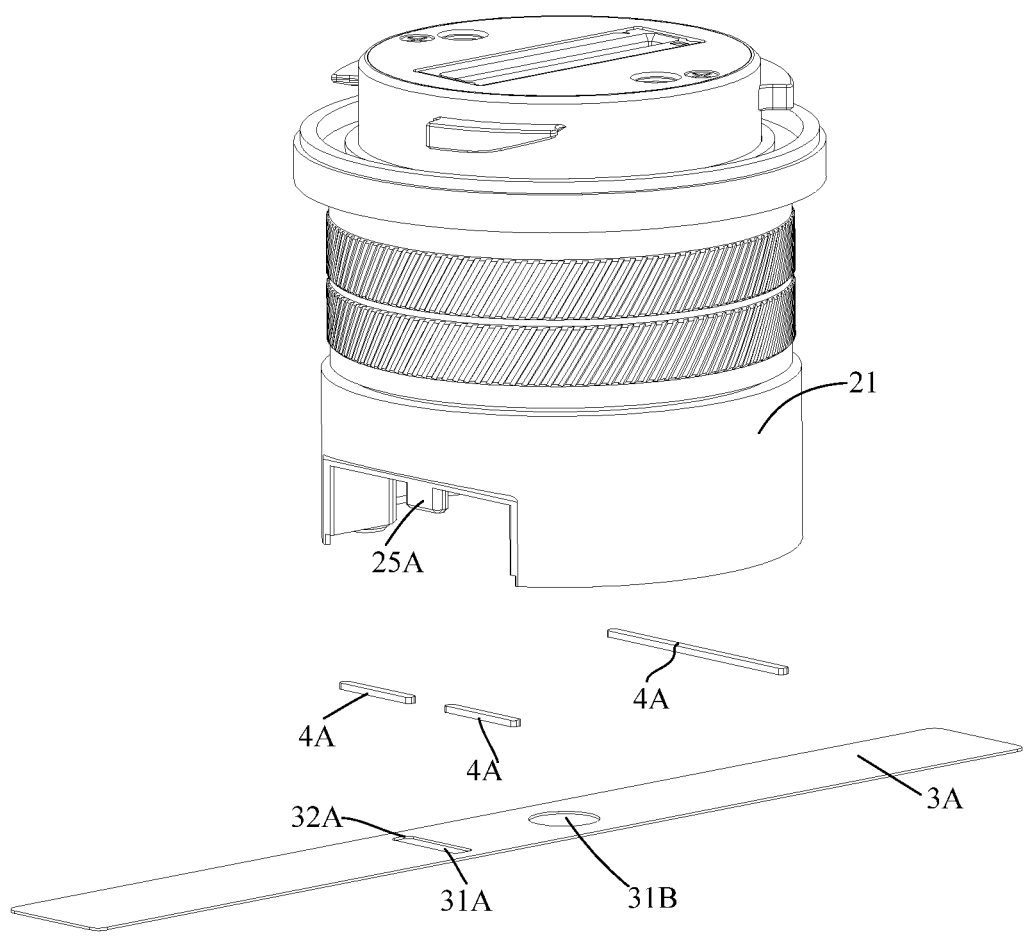
FIG. 4 is a schematic exploded structural diagram of an axle base and sealing member assembled according to some exemplary embodiments of this disclosure.

In some exemplary embodiments, as shown in FIG. 3 and FIG. 4, the sealing member 3 is capable of being positioned relative to the base 2.

The sealing member 3 may be fixed on the base 2. In this way, when the centroid of the gimbal is adjusted, the sealing member 3 is firstly fixed on the base 2. The arm 1 is capable of moving relative to the sealing member 3 and the base 2. After a positional relationship between the arm 1 and the base 2 is determined, that is, after the arm 1 is adjusted to a preset position relative to the base 2, positions of the arm 1 and the base 2 are fixed. This avoids motion of the sealing member 3 or necessity of holding the sealing member 3 with a hand during moving of the arm 1 relative to the base 2 due to that the sealing member 3 cannot be fixed on the base 2, which may otherwise increase adjustment difficulty of the arm adjustment structure.

Further, the sealing member 3A is capable of being positioned relative to the yaw axle base 21, and the sealing member 3B is capable of being positioned relative to the roll axle base 22.

In some exemplary embodiments, a first positioning part is disposed on the base 2, a first positioning fitting part corresponding to the first positioning part is disposed on the sealing member 3, and the first positioning part engages with the first positioning fitting part, for positioning between the base 2 and the sealing member 3.

The first positioning part engages with the first positioning fitting part to implement positioning between the base 2 and the sealing member 3. In this way, when the centroid of the gimbal is adjusted, the first positioning part and the first positioning fitting part are engaged firstly, and the arm 1 is capable of moving relative to the sealing member 3 and the base 2. After a positional relationship between the arm 1 and the base 2 is determined, that is, after the arm 1 and the base 2 are adjusted to preset positions, the positions of the arm 1 and the base 2 are fixed. This avoids motion of the sealing member 3 or necessity of holding the sealing member 3 with a hand during moving of the arm 1 relative to the base 2 due to that the sealing member 3 cannot be fixed on the base 2, which may otherwise increase adjustment difficulty of the arm adjustment structure.

Further, a first positioning part is disposed on the yaw axle base 21, a first positioning fitting part corresponding to the first positioning part is disposed on the sealing member 3A, and the first positioning part engages with the first positioning fitting part, for positioning between the yaw axle base 21 and the sealing member 3A. A first positioning part is disposed on the roll axle base 22, a first positioning fitting part corresponding to the first positioning part is disposed on the sealing member 3B, and the first positioning part engages with the first positioning fitting part, for positioning between the roll axle base 22 and the sealing member 3B.

In some exemplary embodiments, the first positioning part includes a positioning protrusion 25 disposed on the base 2, the first positioning fitting part includes a positioning hole 32 disposed on the sealing member 3 and engaging with the positioning protrusion 25. The positioning protrusion 25 is located in the positioning hole 32. As shown in FIG. 3, a positioning protrusion disposed on the yaw axle base 21 is a positioning protrusion 25A, a positioning protrusion disposed on the roll axle base 22 is 25B, and there are two positioning protrusions 25B; a positioning hole disposed on the sealing member 3A is a positioning hole 32A, and a positioning hole disposed on the sealing member 3B is a positioning hole 32B.

The first positioning part includes a positioning protrusion 25 formed by the base 2 protruding toward the sealing member 3, the first positioning fitting part includes a positioning hole 32, and the positioning protrusion 25 is inserted into the positioning hole 32. When the sealing member 3 is connected to the base 2, the positioning protrusion 25 and the positioning hole 32 are engaged to implement a positioning function. In this way, the sealing member 3 is positioned on the base 2. In addition, the sealing member 3 and the base 2 may be driven to move together relative to the arm 1, and movement of the sealing member 3 during relative moving of the base 2 and the arm 1 may be avoided.

There may be one or more positioning protrusions 25, a quantity of positioning holes 32 is equal to a quantity of positioning protrusions 25, and the positioning holes 32 correspond to the positioning protrusions 25 on a one-to-one basis. Further, when there are a plurality of positioning protrusions 25, there are a plurality of positioning holes 32, the plurality of positioning protrusions 25 are evenly disposed, and the plurality of positioning holes 32 are also evenly disposed.

In some exemplary embodiments, the first positioning part includes a positioning hole 32 disposed on the base 2, the first positioning fitting part includes a positioning protrusion 25 disposed on the sealing member 3 and engaging with the positioning hole 32, and the positioning protrusion 25 is located in the positioning hole 32.

The first positioning part includes a positioning hole 32 disposed on the base 2, the first positioning fitting part includes a positioning protrusion 25 formed by the sealing member 3 protruding toward the base 2, and the positioning protrusion 25 is inserted into the positioning hole 32. When the sealing member 3 is connected to the base 2, the positioning protrusion 25 and the positioning hole 32 are engaged to implement a positioning function. In this way, the sealing member 3 is positioned on the base 2. In addition, the sealing member 3 and the base 2 may be driven to move together relative to the arm 1, and movement of the sealing member 3 during relative moving of the base 2 and the arm 1 may be avoided.

There may be one or more positioning protrusions 25, a quantity of positioning holes 32 is equal to a quantity of positioning protrusions 25, and the positioning holes 32 correspond to the positioning protrusions 25 on a one-to-one basis. Further, when there are a plurality of positioning protrusions 25, there are a plurality of positioning holes 32, the plurality of positioning protrusions 25 are evenly disposed, and the plurality of positioning holes 32 are also evenly disposed.

In some exemplary embodiments, the first positioning part includes a positioning protrusion 25 and a positioning hole 32 disposed on the base 2, the first positioning fitting part includes a positioning hole 32 disposed on the sealing member 3 and engaging with the positioning protrusion 25 on the base 2, and a positioning protrusion 25 disposed on the sealing member 3 and engaging with the positioning hole 32 on the base 2, the positioning protrusion 25 on the base 2 is located in the positioning hole 32 on the sealing member 3, and positioning protrusion 25 on the sealing member 3 is located in the positioning hole 32 on the base 2. That is, both a positioning protrusion 25 and a positioning hole 32 may be disposed on the base 2, and correspondingly, both a positioning protrusion 25 and a positioning hole 32 may also be disposed on the sealing member 3. In this case, the positioning protrusions 25 and the positioning holes 32 on the base 2 and the sealing member 3 may be arranged alternately or may be disposed at intervals, as long as the corresponding positioning protrusions 25 and positioning holes 32 may be engaged to complete the fixing when the sealing member 3 is fixed on the base 2.

Specifically, the positioning protrusion 25 on the base 2 corresponds to the positioning hole 32 on the sealing member 3, and the positioning hole 32 on the base 2 corresponds to the positioning protrusion 25 on the sealing member 3. The positioning protrusion 25 on the base 2 is inserted into the positioning hole 32 on the sealing member 3, and the positioning protrusion 25 on the sealing member 3 is inserted into the positioning hole 32 on the base 2. When the sealing member 3 is connected to the base 2, the positioning protrusion 25 on the base 2 engages with the positioning hole 32 on the sealing member 3, and the positioning hole 32 on the base 2 engages with the positioning protrusion 25 on the sealing member 3, so as to implement a positioning function. In this way, the sealing member 3 is positioned on the base 2. In addition, the sealing member 3 and the base 2 may be driven to move together relative to the arm 1, and movement of the sealing member 3 during relative moving of the base 2 and the arm 1 may be avoided.

There may be one or more positioning protrusions 25 on the base 2, a quantity of positioning holes 32 on the sealing member 3 is equal to a quantity of positioning protrusions 25, and the positioning holes 32 on the sealing member 3 correspond to the positioning protrusions 25 on a one-to-one basis. Further, when there are a plurality of positioning protrusions 25 on the base 2, there are a plurality of positioning holes 32 on the sealing member 3, the plurality of positioning protrusions 25 on the base 2 are evenly disposed, and the plurality of positioning holes 32 on the sealing member 3 are also evenly disposed.

There may be one or more positioning protrusions 25 on the sealing member 3, a quantity of positioning holes 32 on the base 2 is equal to a quantity of positioning protrusions 25, and the positioning holes 32 on the base 2 correspond to the positioning protrusions 25 on a one-to-one basis. Further, when there are a plurality of positioning protrusions 25 on the sealing member 3, there are a plurality of positioning holes 32 on the base 2, the plurality of positioning protrusions 25 on the sealing member 3 are evenly disposed, and the plurality of positioning holes 32 on the base 2 are also evenly disposed.

Figure 5:
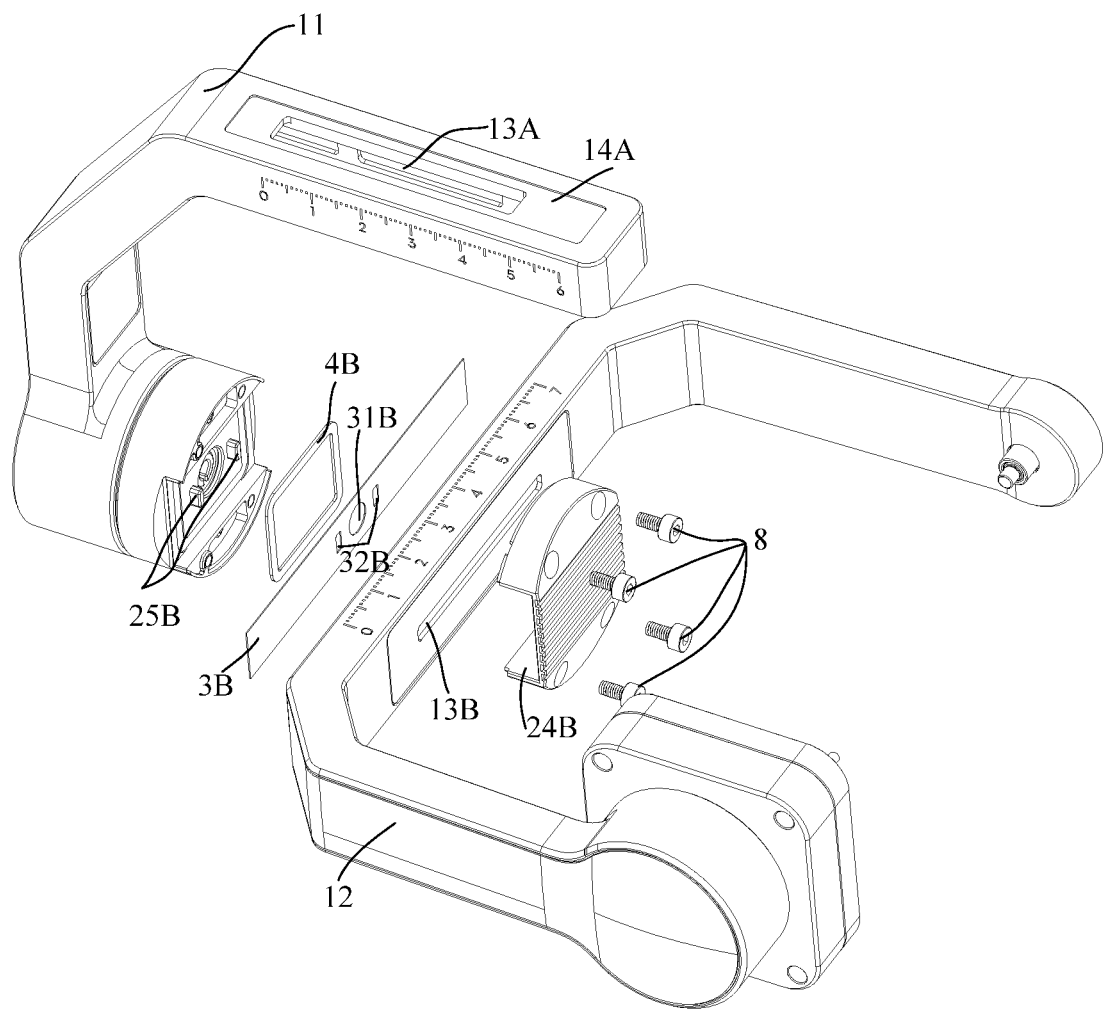
FIG. 5 is a partial schematic exploded structural diagram of a gimbal according to some exemplary embodiments of this disclosure.

In some exemplary embodiments, at least one of the positioning protrusion 25 and the positioning hole 32 is surrounded by a sealing gasket 4. As shown in FIG. 4 and FIG. 5, a sealing gasket disposed between the sealing member 3A and the yaw axle base 21 is a sealing gasket 4A, and a sealing gasket disposed between the sealing member 3B and the roll axle base 22 is a sealing gasket 4B.

The sealing gasket 4 is disposed around the positioning protrusion 25 and/or the positioning hole 32 to implement sealing between the base 2 and the sealing member 3 around the positioning protrusion 25 and/or the positioning hole 32, so as to prevent the arrangement of the positioning protrusion 25 and the positioning hole 32 from causing a gap between the base 2 and the sealing member 3.

In some exemplary embodiments, the sealing member 3 is capable of being fixed to the base 2. Any means of fixing the sealing member 3 may be applicable. In some exemplary embodiments, the sealing member 3 may be capable of being bonded to the base 2. For example, the sealing member 3A is capable of being bonded to the yaw axle base 21, and the sealing member 3B is capable of being bonded to the roll axle base 22. Simple for illustration purposes, the following description takes bonding as an example for the means of fixing one part to the other. However, one of ordinary skill in the art would understand that any proper means of fixation may be applicable.

The sealing member 3 is bonded to the base 2 to implement positioning of the sealing member 3 relative to the base 2, and fix the sealing member 3 on the base 2. Moreover, the bonding manner is simple, its cost is low, and operations are convenient. The bonding manner may avoid formation of a gap between the sealing member 3 and the base 2, and further prevent water droplets, dust, and the like from entering the gimbal through a connection between the sealing member 3 and the base 2.

In some exemplary embodiments, the sealing member 3 is capable of being positioned relative to the arm 1. For example, the sealing member 3A is capable of being positioned by the yaw axle arm 11, and the sealing member 3B is capable of being positioned by the roll axle arm 12.

After the arm 1 and the base 2 are adjusted to preset positions, the sealing member 3 may be positioned on the arm 1 to enhance firmness of the sealing member 3 disposed and prevent the clearing slot 13 from being exposed due to moving of the sealing member 3 relative to the arm 1 during use of the gimbal. This further improves waterproof and dustproof performance of the gimbal.

Regarding an implementation of positioning the sealing member 3 relative to the arm 1, in a specific embodiment, a second positioning part is disposed on the arm 1, a second positioning fitting part corresponding to the second positioning part is disposed on the sealing member 3, and the second positioning part engages with the second positioning fitting part, for positioning between the arm 1 and the sealing member 3. Further, a second positioning part is disposed on the yaw axle arm 11, a second positioning fitting part corresponding to the second positioning part is disposed on the sealing member 3A, and the second positioning part engages with the second positioning fitting part, for positioning between the yaw axle arm 11 and the sealing member 3A. A second positioning part is disposed on the roll axle arm 12, a second positioning fitting part corresponding to the second positioning part is disposed on the sealing member 3B, and the second positioning part engages with the second positioning fitting part, for positioning between the roll axle arm 12 and the sealing member 3B.

The second positioning part engages with the second positioning fitting part, so that the sealing member 3 may be fixed on the arm 1. In this way, the sealing member 3 is prevented from being misaligned with the clearing slot 13, which may otherwise cause foreign matters such as water droplets and dust to enter the gimbal through the clearing slot 13.

The second positioning part includes a positioning column disposed on the arm 1, and the second positioning fitting part includes a positioning slot disposed on the sealing member 3 and corresponding to the positioning column; and/or the second positioning part includes a positioning slot disposed on the arm 1, and the second positioning fitting part includes a positioning column disposed on the sealing member 3 and corresponding to the positioning slot. Certainly, both a positioning column and a positioning slot may also be disposed on the arm 1, and correspondingly, both a positioning column and a positioning slot may also be disposed on the sealing member 3. In this case, the positioning columns and the positioning slots on the arm 1 and the sealing member 3 may be disposed alternately or may be disposed at intervals, as long as the corresponding positioning columns and positioning slots may be engaged to complete the fixing when the sealing member 3 is fixed on the arm 1. To improve sealing performance at an engaging part between the positioning column and the positioning slot, a sealing gasket may be disposed around the positioning column and/or the positioning slot.

In some exemplary embodiments, the sealing member 3 is capable of being bonded to the arm 1. For example, the sealing member 3A is capable of being bonded to the yaw axle arm 11, and the sealing member 3B is capable of being bonded to the roll axle arm 12.

The sealing member 3 is bonded to the arm 1 to implement positioning of the sealing member 3 relative to the arm 1 and fix the sealing member 3 on the arm 1. Moreover, the bonding manner is simple, its cost is low, and operations are convenient. The bonding manner may avoid formation of a gap between the sealing member 3 and the arm 1, and further prevent water droplets, dust, and the like from entering the gimbal through a connection between the sealing member 3 and the arm 1.

In some exemplary embodiments, the arm adjustment structure includes: the base 2 including a base body 23 and a base cover 24, the base body 23 and the base cover 24 define a mounting space, and the arm 1 is confined in the mounting space.

The arm 1 is confined in the mounting space, so that the positioning of the arm 1 relative to the base 2 may be implemented, and movement of the arm 1 relative to the base 2 during use of the gimbal may be avoided.

The base body 23 and the base cover 24 may be detachably connected, for example, connected via a screw 8 or through clamping. When the centroid of the gimbal needs to be adjusted, the base body 23 is separated from the base cover 24, and the arm 1 moves relative to the base body 23. When the arm 1 is adjusted to a preset position relative to the base body 23, the base cover is mounted on the base body 23 to lock the arm 1, and the arm 1 is thus confined in the mounting space defined by the base body 23 and the base cover 24.

Further, the sealing member 3 is disposed between the base body 23 and the arm 1.

For example, as shown in FIG. 1, the yaw axle base 21 includes a base body 23A and a base cover 24A, the base body 23A and the base cover 24A define a mounting space, and the yaw axle arm 11 is confined in the mounting space. The roll axle base 22 includes a base body 23B and a base cover 24B, the base body 23B and the base cover 24B define a mounting space, and the roll axle arm 12 is confined in the mounting space. The sealing member 3A is disposed between the base body 23A and the yaw axle arm 11, and the sealing member 3B is disposed between the base body 23B and the roll axle arm 12. In other words, the base cover 24A may be combined with the yaw axle base to lock the yaw axle arm and the sealing member 3A on the yaw axle arm, and the base cover 24B may be combined with the roll axle base to lock the roll axle arm and the sealing member 3B on the roll axle arm.

In some exemplary embodiments, the clearing slot 13 is partially or fully located in the mounting space, and the sealing member 3 is partially or fully located in the mounting space, so that the sealing member 3 is confined in the mounting space.

The clearing slot 13 is at least partially located in the mounting space, and the sealing member 3 covers the clearing slot 13, so that the sealing member 3 is at least partially located in the mounting space. The sealing member 3 is confined in the mounting space, so that firmness of positioning between the sealing member 3 and the base 2 and between the sealing member 3 and the arm 1 is further achieved.

In some exemplary embodiments, a mounting slot 14 for mounting the sealing member 3 is disposed on the arm 1, and a circumferential dimension of the mounting slot 14 is greater than a circumferential dimension of the clearing slot 13. As shown in FIG. 2, a mounting slot 14A for mounting the sealing member 3A is disposed on the yaw axle arm 11, and after a release paper on the sealing member 3A is removed, the sealing member 3A may be attached in the mounting slot 14A and tightly fits onto the yaw axle arm 11. A circumferential dimension of the mounting slot 14A is greater than a circumferential dimension of the clearing slot 13A; and a mounting slot 14B for mounting the sealing member 3B is disposed on the roll axle arm 12. After a release paper on the sealing member 3B is removed, the sealing member 3B may be attached in the mounting slot 14B and tightly fits onto the roll axle arm 12. A circumferential dimension of the mounting slot 14B is greater than a circumferential dimension of the clearing slot 13B.

The mounting slot provided may make the sealing member tightly fit onto the arm. The circumferential dimension of the mounting slot 14 is greater than the circumferential dimension of the clearing slot 13. Therefore, after the sealing member 3 is disposed in the mounting slot 14, a circumference of the clearing slot 13 may be sealed to enhance a sealing effect of the sealing member 3 on the clearing slot 13, and it is also easier to mount and align the sealing member 3. In addition, this may avoid a sealing failure from occurring when the sealing member 3 enters the clearing slot 13 as a size of the clearing slot 13 is the same as a size of the mounting slot 14, or a size of the clearing slot 13 is greater than a size of the mounting slot 14.

In some exemplary embodiments, the arm adjustment structure further includes an electrical connection member that passes through the clearing slot 13.

The clearing slot 13 is disposed on the arm 1. The electrical connection member passes through the clearing slot 13. Thus, when the arm 1 moves relative to the base 2, the electrical connection member moves in the clearing slot 13 with the arm 1 relative to the clearing slot 13. Therefore, the clearing slot 13 may provide a clear space for the electrical connection member, and does not affect connection reliability of the electrical connection member when the arm 1 moves relative to the base 2.

Figure 6:
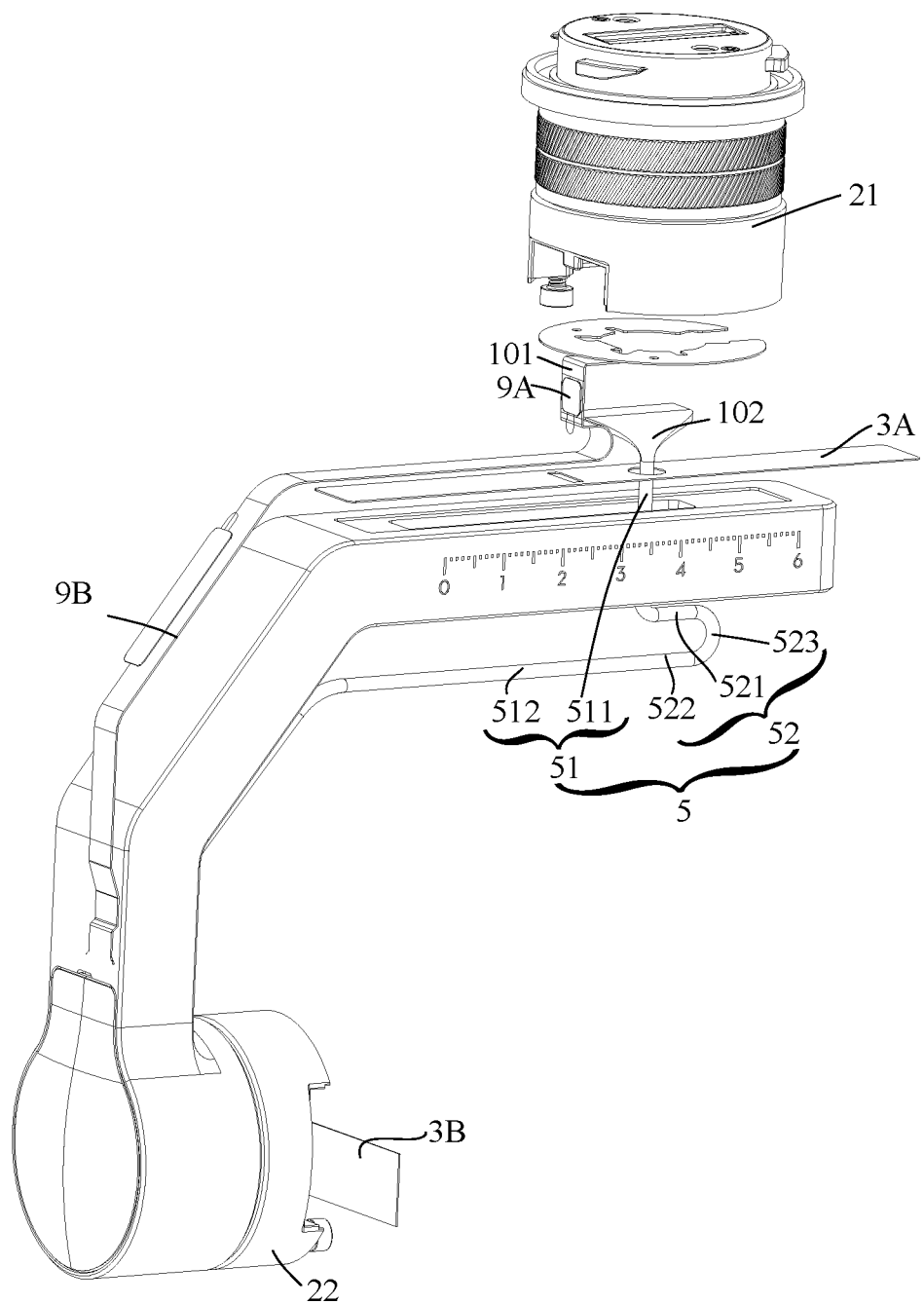
FIG. 6 is a partial schematic exploded structural diagram of a gimbal according to some exemplary embodiments of this disclosure.

In some exemplary embodiments, as shown in FIG. 6, the electrical connection member includes a first electrical connection member 101, and the first electrical connection member 101 is capable of being partially positioned relative to the arm 1. Further, the first electrical connection member 101 is capable of being partially positioned relative to the yaw axle arm 11.

The first electrical connection member 101 is capable of being partially positioned relative to the arm 1, and during moving of the arm 1 relative to the base 2, the first electrical connection member 101 is prevented from swinging randomly.

Further, the electrical connection member further includes a second electrical connection member 102. The first electrical connection member 101 is capable of being partially positioned relative to the arm 1, and during moving of the arm 1 relative to the base 2, the first electrical connection member 101 may be prevented from swinging randomly, which may otherwise cause entanglement or wear with the second electrical connection member 102.

In some exemplary embodiments, the first electrical connection member 101 is capable of being bonded to an inner side of the arm 1.

The first electrical connection member 101 is partially located in the arm 1 and bonded to the inner side of the arm 1 to implement positioning between the first electrical connection member 101 and the arm 1, and prevent the first electrical connection member 101 from swinging randomly with the arm 1. Moreover, the bonding manner is simple in operation, and low in cost.

An adhesive may be provided on an inner side of the first electrical connection member 101 or the arm 1. After removing a release paper of the adhesive, the first electrical connection member 101 is bonded to the inner side of the arm 1. It may be understood that an adhesive may also be applied to the first electrical connection member 101 or the inner side of the arm 1 to implement bonding therebetween.

In some exemplary embodiments, the first electrical connection member 101 is capable of being positioned relative to the base 2.

The first electrical connection member 101 is capable of being partially positioned relative to the base 2, and during moving of the arm 1 relative to the base 2, the first electrical connection member 101 is prevented from swinging randomly.

In some exemplary embodiments, the first electrical connection member 101 is capable of being bonded to an inner side of the base 2.

The first electrical connection member 101 is partially located in the base 2 and bonded to the base 2 to implement positioning between the first electrical connection member 101 and the base 2 and prevent the first electrical connection member 101 from swinging randomly with the arm 1. Moreover, the bonding manner is simple in operation, and low in cost.

An adhesive may be provided on the first electrical connection member 101 or the base 2. After a release paper of the adhesive is removed, the first electrical connection member 101 is bonded to the base 2. It may be understood that an adhesive may also be applied to the first electrical connection member 101 or the base 2 to implement bonding therebetween.

As shown in FIG. 6, the first electrical connection member 101 includes an upper end portion and a lower end portion that are disposed opposite to each other, an adhesive 9A is provided on the upper end portion so that the upper end portion of the first electrical connection member 101 is bonded to the yaw axle base 21, and an adhesive 9B is provided on the lower end portion so that the lower end portion of the first electrical connection member 101 is bonded to an inner wall of the yaw axle arm 11.

In some exemplary embodiments, the electrical connection member includes at least one of an FPC cable, a coaxial cable 5, or a flexible flat cable.

The electrical connection member may connect a load 7 to a motor. The FPC cable, the coaxial cable 5, and the flexible flat cable may all connect the load 7 to the motor. Further, the first electrical connection member 101 is an FPC cable (FPC flat cable), and the second electrical connection member 102 is a coaxial cable 5.

In some exemplary embodiments, a through hole 31 provided for the electrical connection member to pass through is disposed on the sealing member 3.

The through hole 31 is disposed on the sealing member 3, and the electrical connection member(s) may pass through the through hole 31. Therefore, disposition of the sealing member 3 does not affect a normal connection of the electrical connection member.

Further, the through hole 31 includes a through hole 31A provided for the first electrical connection member 101 to pass through and a through hole 31B provided for the second electrical connection member 102 to pass through. To maintain integrity of the sealing member 3 as much as possible and enhance waterproof and dustproof performance of the sealing member 3, if a positioning protrusion 25 is disposed on the base 2 and a positioning hole 32A is disposed on the sealing member 3A, the through hole 31A may be connected to the positioning hole 32A, so that the through hole 31A and the positioning hole 32A are combined into one hole, and that a quantity of holes opened on the sealing member 3 is minimized.

In some exemplary embodiments, a first sealing component is disposed between the sealing member 3 and the base 2, and the first sealing component is used for sealing between the sealing member 3 and the base 2. For example, a first sealing component is disposed between the sealing member 3A and the yaw axle base 21, and the first sealing component is used for sealing between the sealing member 3A and the yaw axle base 21; and a first sealing component is disposed between the sealing member 3B and the roll axle base 22, and the first sealing component is used for sealing between the sealing member 3B and the roll axle base 22.

When the base cover 24 is connected to the base body 23 and the arm adjustment structure is locked, the first sealing component may fill a gap between the sealing member 3 and the base 2 to prevent water droplets, sand, and dust from entering the gimbal through the gap.

Further, the first sealing component may be a sealing gasket 4 or a waterproof gasket.

In some exemplary embodiments, the first sealing component is bonded to the sealing member 3.

The bonding between the first sealing component and the sealing member 3 may enhance the strength of a connection between the first sealing component and the sealing member 3. Moreover, the bonding manner is simple in operation, and low in cost. The bonding may further avoid formation of a gap between the first sealing component and the sealing member 3.

An adhesive may be disposed on the first sealing component or the sealing member 3 to implement bonding therebetween. Alternatively, a glue may be applied on the first sealing component or the sealing member 3 to implement bonding therebetween.

In some exemplary embodiments, the first sealing component is bonded to the base 2.

The bonding between the first sealing component and the base 2 may enhance the strength of a connection between the first sealing component and the base 2. Moreover, the bonding manner is simple in operation, and low in cost. The bonding may further avoid formation of a gap between the first sealing component and the base 2.

An adhesive may be disposed on the first sealing component or the base 2 to implement bonding therebetween. Alternatively, a glue is applied on the first sealing component or the base 2 to implement bonding therebetween.

In some exemplary embodiments, the first sealing component is disposed on an outer side of the through hole 31. The first sealing component between the sealing member 3A and the yaw axle base 21 is located on an outer side of the through hole 31A and an outer side of the through hole 31B. The first sealing component between the sealing member 3B and the roll axle base 22 is located on the outer side of the through hole 31B and an outer side of the positioning hole 32B.

Since the first sealing component is located on the outer side of the through hole 31, the through hole 31 is located inside a sealed area jointly enclosed by the first sealing component, the sealing member 3 and the base 2 to prevent water droplets, dust, and the like from entering the gimbal through the through hole 31.

Further, the first sealing component is located on an outer side of a first through hole 31 and an outer side of a second through hole 31.

In some exemplary embodiments, the first sealing component includes one or more sealing gaskets 4, and the through hole 31 is surrounded by the sealing gasket(s) 4.

A quantity, size(s), and shape(s) of first sealing components may be properly set according to shapes and sizes of the base 2 and the sealing member 3, so that the first sealing components may be disposed conveniently.

When the first sealing component includes a sealing gasket 4, the sealing gasket 4 is ring-shaped and sleeved over the outer side of the through hole 31. When the first sealing component is a plurality of sealing gaskets 4, the plurality of sealing gaskets 4 are disposed around the through hole 31.

As shown in FIG. 4, the first sealing component between the sealing member 3A and the yaw axle base 21 is a plurality of sealing gaskets 4, and the first sealing component between the sealing member 3B and the roll axle base 22 is one sealing gasket 4. Specifically, a quantity of first sealing components disposed between the sealing member 3 and the yaw axle base 21 is three, among them, two are disposed near the positioning protrusion 25A and located on two opposing sides of the positioning protrusion 25A, and another first sealing component is disposed on one side of the yaw axle base 21 opposite to the positioning protrusion 25A. One first sealing component is disposed between the sealing member 3 and the roll axle base 22, and is ring-shaped.

In some exemplary embodiments, a hollow structure is disposed on the base 2, the electrical connection member passes through the hollow structure, a second sealing component is disposed between the electrical connection member and the hollow structure, and the second sealing component is used for sealing between the electrical connection member and the hollow structure.

The second sealing component is used to fill the electrical connection member and the hollow structure to implement sealing between the electrical connection member and the hollow structure. While internal wiring of the hollow structure is implemented, water droplets and dust are prevented from reaching the inside of the gimbal through the hollow structure. In this way, the purpose of waterproof and dustproof has been achieved. In this case, the sealing member 3 may only serve the purpose of covering the clearing slot 13 in appearance.

In some exemplary embodiments, the hollow structure includes a motor axle, and the second sealing component includes a rubber and/or silica-gel sealing component. For example, the second sealing component is made of a butyl rubber material.

The second sealing component is used to fill the motor axle. While internal wiring of the motor axle is implemented, water droplets and dust are prevented from reaching a position of an electronic speed control board along the motor axle, and parts that need to be protected are separated, so as to achieve the purpose of waterproof and dustproof.

The following describes some exemplary embodiments of a second aspect of this disclosure.

Figure 7:
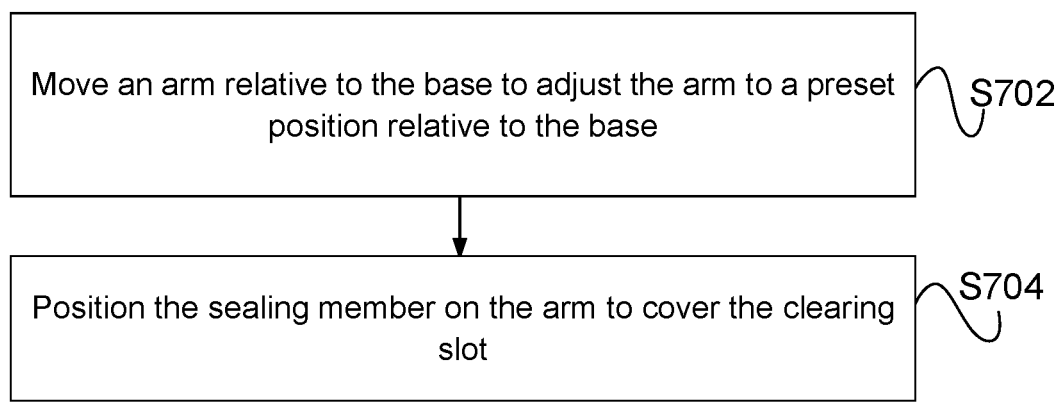
FIG. 7 is a schematic flowchart of an adjustment method for an arm adjustment structure according to some exemplary embodiments of this disclosure.

FIG. 7 shows an adjustment method for an arm adjustment structure. The arm adjustment structure includes a base 2, an arm 1, and a sealing member 3. The arm 1 is capable of moving relative to the base 2, a clearing slot 13 is disposed on the arm 1, and the sealing member 3 is used to cover the clearing slot 13. The adjustment method includes steps S702 and S704.

Step S702: Move the arm 1 relative to the base 2, to adjust the arm 1 to a preset position relative to the base 2.

Step S704: Position the sealing member 3 on the arm 1 to cover the clearing slot 13.

After the arm 1 is adjusted to the preset position relative to the base 2, an adjustment of a centroid of a gimbal is completed to adapt to a variety of different types of loads 7 such as a lidar and a multispectral camera. Then the sealing member 3 is positioned on the arm 1 and covers the clearing slot 13 to prevent the sealing member 3 from being misaligned with the clearing slot 13, prevent the clearing slot 13 from being exposed, and prevent foreign matters such as water droplets, sand, and dust from entering the clearing slot 13 and affecting normal use of the gimbal. Therefore, the sealing member 3 implements waterproof and dustproof functions and improves use reliability of the gimbal.

Figure 8:
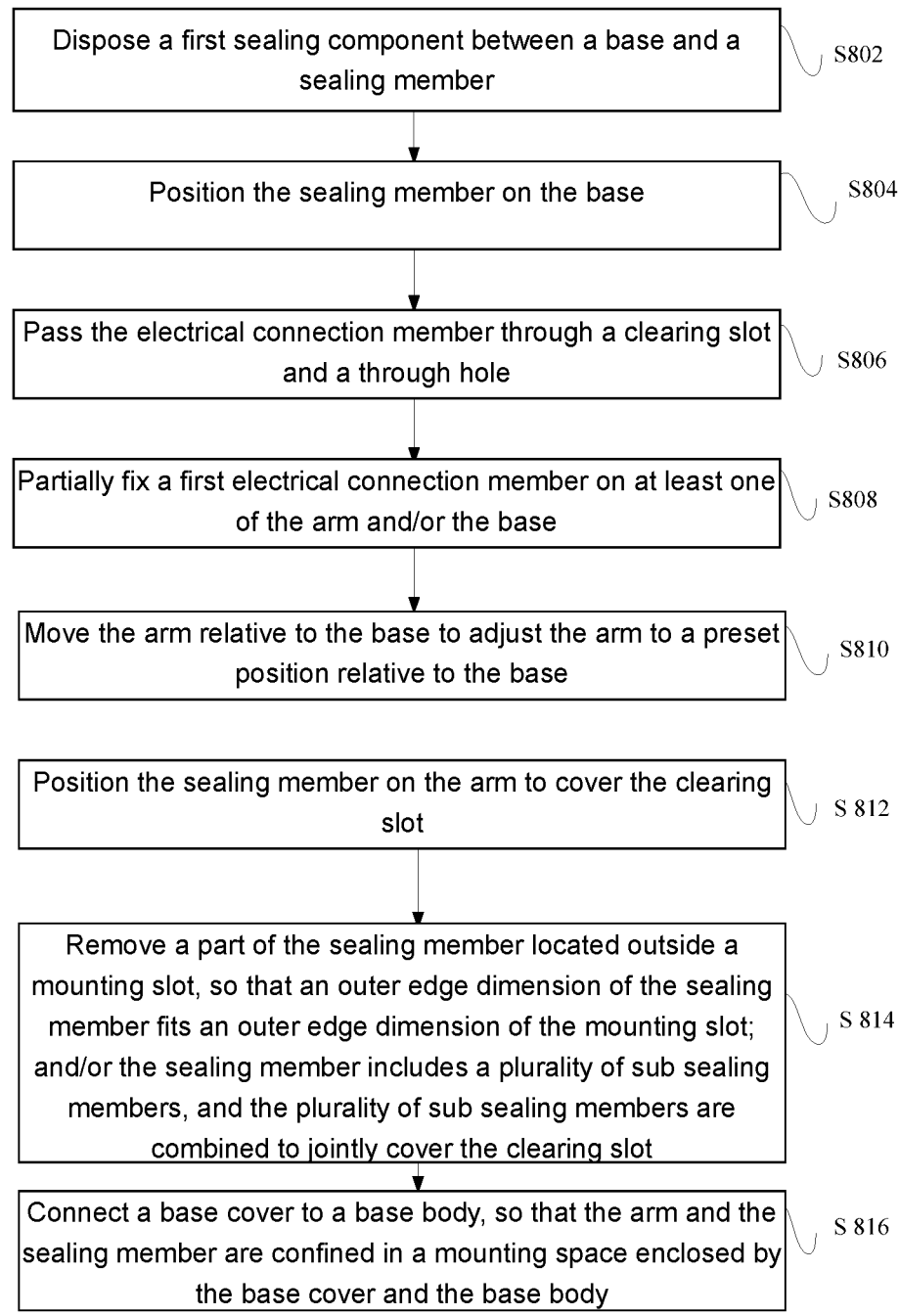
FIG. 8 is a schematic flowchart of an adjustment method for an arm adjustment structure according to some exemplary embodiments of this disclosure.

As shown in FIG. 8, in some exemplary embodiments, an adjustment method includes step S802 to step S816.

Step S802: Dispose a first sealing component between the base 2 and the sealing member 3, where the first sealing component is used for sealing between the base 2 and the sealing member 3. Step S802 may also be replaced with step S802': dispose a second sealing component between a second electrical connection member 102 and a hollow structure, where the hollow structure is provided on the base 2, an arm adjustment structure includes an electrical connection member, and the electrical connection member includes the second electrical connection member 102. Alternatively, step S802 and step S802' are both performed.

Step S804: Position the sealing member 3 on the base 2.

Step S806: Pass the electrical connection member through a clearing slot 13 and a through hole 31, where the arm adjustment structure includes the electrical connection member, and the through hole 31 provided for the electrical connection member to pass through is disposed on the sealing member 3.

Step S808: Partially fix a first electrical connection member 101 on at least one of the arm 1 and the base 2, where the electrical connection member includes the first electrical connection member 101.

Step S810: Move the arm 1 relative to the base 2 to adjust the arm 1 to a preset position relative to the base 2.

Step S812: Position the sealing member 3 on the arm 1 to cover the clearing slot 13.

Step S814: Remove a part of the sealing member 3 that is located outside a mounting slot 14, so that an outer edge dimension of the sealing member 3 engages withfits an outer edge dimension of the mounting slot 14. Step S814 may also be: the sealing member 3 including a plurality of sub sealing members, and the plurality of sub sealing members are combined to jointly cover the clearing slot 13.

Step S816: Connect a base cover 24 to a base body 23, so that the arm 1 and the sealing member 3 are confined in a mounting space enclosed by the base cover 24 and the base body 23.

It should be noted that the sequence of steps S802 to S814 is not fixed, and each step may be performed flexibly according to an operation requirement in a practical application, and this still falls within the scope of protection of this disclosure.

In step S802, in the case where the first sealing component is provided, when the base cover 24 is connected to the base body 23 and the arm adjustment structure is locked, the first sealing component may fill a gap between the sealing member 3 and the base 2 to prevent water droplets, sand, and dust from entering a gimbal through the gap. In step S802, in the case where the second sealing component is provided, the second sealing component is used to fill the electrical connection member and the hollow structure to implement sealing between the electrical connection member and the hollow structure. While internal wiring of the hollow structure is implemented, water droplets and dust are prevented from reaching the inside of the gimbal through the hollow structure. In this way, the purpose of waterproof and dustproof are achieved. In this case, the sealing member 3 may only serve a purpose of covering the clearing slot 13 in appearance.

In step S804, the sealing member 3 may be fixed on the base 2. Accordingly, when a centroid of the gimbal is adjusted, the sealing member 3 is firstly fixed on the base 2. The arm 1 is capable of moving relative to the sealing member 3 and the base 2. After a positional relationship between the arm 1 and the base 2 is determined, that is, after the arm 1 and the base 2 are adjusted to preset positions, positions of the arm 1 and the base 2 are fixed. This avoids movement of the sealing member 3 or necessity of holding the sealing member 3 with a hand during moving of the arm 1 relative to the base 2 as the sealing member 3 cannot be fixed on the base 2, which may otherwise increase adjustment difficulty of the arm adjustment structure.

Step S804 of positioning the sealing member 3 on the base 2 specifically includes: engaging a first positioning part on the base 2 with a first positioning fitting part on the sealing member 3, to implement positioning between the base 2 and the sealing member 3; and/or bonding the sealing member 3 to the base 2.

The first positioning part engages with the first positioning part to implement positioning between the base 2 and the sealing member 3. In this way, when the centroid of the gimbal is adjusted, the first positioning part and the first positioning part are firstly engaged, and the arm 1 is capable of moving relative to the sealing member 3 and the base 2. After a positional relationship between the arm 1 and the base 2 is determined, that is, after the arm 1 and the base 2 are adjusted to preset positions, the positions of the arm 1 and the base 2 are fixed. This avoids movement of the sealing member 3 or necessity of holding the sealing member 3 with a hand during moving of the arm 1 relative to the base 2 as the sealing member 3 cannot be fixed on the base 2, which may otherwise increase adjustment difficulty of the arm adjustment structure. The sealing member 3 may be bonded to the base 2 to implement positioning of the sealing member 3 relative to the base 2 and fix the sealing member 3 on the base 2. Moreover, the bonding manner is simple, the cost is low, and the operation is convenient. The bonding manner may avoid formation of a gap between the sealing member 3 and the base 2, and further prevent water droplets, dust, and the like from entering the gimbal through a connection between the sealing member 3 and the base 2.

In step S806, the clearing slot 13 is disposed on the arm 1. After the electrical connection member passes through the clearing slot 13, when the arm 1 moves relative to the base 2, the electrical connection member moves in the clearing slot 13 with the arm 1 relative to the clearing slot 13. Therefore, the clearing slot 13 may provide a clear space for the electrical connection member, and does not affect connection reliability of the electrical connection member when the arm 1 moves relative to the base 2. The through hole 31 is disposed on the sealing member 3, and the electrical connection member may pass through the through hole 31. Therefore, disposition of the sealing member 3 does not affect a normal connection of the electrical connection member.

In step S808, the first electrical connection member 101 is capable of being partially positioned relative to the arm 1, and during moving of the arm 1 relative to the base 2, the first electrical connection member 101 is prevented from swinging randomly, which may otherwise cause entanglement with the second electrical connection member 102. The first electrical connection member 101 is capable of being partially positioned relative to the base 2, and during moving of the arm 1 relative to the base 2, the first electrical connection member 101 is prevented from swinging randomly.

In step S810, the arm 1 is moved relative to the base 2 to adjust the centroid of the gimbal.

In step S812, the sealing member 3 is capable of being positioned relative to the arm 1.

After the arm 1 and the base 2 are adjusted to preset positions, the sealing member 3 may be positioned on the arm 1 to enhance firmness of the sealing member 3 disposed and prevent the clearing slot 13 from being exposed due to moving of the sealing member 3 relative to the arm 1 during use of the gimbal. This further improves waterproof and dustproof performance of the gimbal.

In step S814, a size of the sealing member 3 is greater than a size of the mounting slot 14. For different loads 7, after the centroid of the gimbal is adjusted, a moving distance of the arm 1 relative to the base 2 is different, and the size of the sealing member 3 is greater than the size of the mounting slot 14, so that the sealing member 3 may still cover the mounting slot 14 when the arm 1 moves different distances relative to the base 2. To improve the appearance of the gimbal, after the arm 1 reaches the preset position, an extra part of the sealing member 3 needs to be removed, so that the outer edge dimension of the sealing member 3 is consistent with the outer edge dimension of the mounting slot 14. Therefore, the sealing member 3 only needs to be designed with a single length to adapt to centroid adjustment requirements of different loads 7 and gimbals with different centroids. This is simple and efficient, and types of sealing members 3 are reduced. If the sealing member 3 includes a plurality of sub sealing members, the plurality of sub sealing members may be jointed to cover the clearing slot 13, and further, the plurality of sub sealing members are combined together so that the outer edge dimension of the sealing member 3 formed by the joined plurality of sub sealing members is not less than the outer edge dimension of the mounting slot 14. After the arm 1 is adjusted to the preset position, a part of the plurality of sub sealing members beyond the mounting slot 14 is removed.

In step S816, the base cover 24 is connected to the base body 23, so that the arm 1 and the sealing member 3 are confined in the mounting space. Since the arm 1 is confined in the mounting space, positioning of the arm 1 relative to the base 2 is implemented, and moving of the arm 1 relative to the base 2 during use of the gimbal is avoided. The sealing member 3 is confined in the mounting space, so that firmness of positioning between the sealing member 3 and the base 2 and between the sealing member 3 and the arm 1 is further improved.

In some exemplary embodiments, step S812 of positioning the sealing member 3 on the arm 1 specifically includes: engaging a second positioning part on the arm 1 with a second positioning fitting part on the sealing member 3, to implement positioning between the arm 1 and the sealing member 3; and/or bonding the sealing member 3 to the arm 1.

The second positioning part engages with the second positioning fitting part, so that the sealing member 3 may be fixed on the arm 1. In this way, the sealing member 3 is prevented from being misaligned with the clearing slot 13, which may otherwise cause foreign matters such as water droplets and dust to enter the gimbal through the clearing slot 13. The sealing member 3 is bonded to the arm 1 to implement positioning of the sealing member 3 relative to the arm 1 and fix the sealing member 3 on the arm 1. Moreover, the bonding manner is simple, the cost is low, and the operation is convenient. The bonding manner may avoid formation of a gap between the sealing member 3 and the arm 1, and further prevent water droplets, dust, and the like from entering the gimbal through a connection between the sealing member 3 and the arm 1.

Step S808 of partially fixing the first electrical connection member 101 on the arm 1 and/or the base 2 specifically includes: partially bonding the first electrical connection member 101 to an inner side of the arm 1 and/or an inner side of the base 2.

The first electrical connection member 101 is partially located in the arm 1 and bonded to the inner side of the arm 1 to implement positioning between the first electrical connection member 101 and the arm 1 and prevent the first electrical connection member 101 from swinging randomly with the arm 1. Moreover, the bonding manner is simple in operation, and low in cost. The first electrical connection member 101 is partially located in the base 2 and bonded to the base 2 to implement positioning between the first electrical connection member 101 and the base 2 and prevent the first electrical connection member 101 from swinging randomly with the arm 1. Moreover, the bonding manner is simple in operation, and low in cost.

Take the adjustment of the centroid in a direction of a yaw axis of the gimbal as an example, firstly a sealing member 3A and a yaw axle base are fixed together, and the sealing member 3A and the yaw axle base may slide relative to each other on a yaw axle arm. After a relative positional relationship between the yaw axle arm and the yaw axle base is determined, release papers on both sides of the sealing member 3A are removed, thus the sealing member 3A may be bonded to the yaw axle arm via an adhesive. While a clearing slot 13A on the yaw axle arm is blocked and prevented from being exposed, the function of waterproof and dustproof may be achieved.

The following describes some exemplary embodiments of a third aspect of this disclosure.

The embodiment of the third aspect of this disclosure provides a sealing member 3 used for an arm adjustment structure. The arm adjustment structure includes a base 2 and an arm 1, and a clearing slot 13 is disposed on the arm 1. The sealing member 3 is suitable for being disposed between the base 2 and the arm 1, and is capable of being located at the clearing slot 13 to cover the clearing slot 13.

The arm 1 is capable of moving relative to the base 2, so that a centroid of a gimbal may be adjusted to adapt to a variety of different types of loads 7 such as a lidar and a multispectral camera. While the centroid of the gimbal is made adjustable, the sealing member 3 is disposed between the base 2 and the arm 1, and the sealing member 3 is capable of being located at the clearing slot 13 to cover the clearing slot 13, so as to prevent the clearing slot 13 from being exposed, and prevent foreign matters such as water droplets, sand, and dust from entering the gimbal through the clearing slot 13 and affecting normal use of the gimbal. Therefore, the sealing member 3 has waterproof and dustproof functions, and the use reliability of the gimbal is improved.

In some exemplary embodiments, a size of the sealing member 3 is greater than a size of the clearing slot 13.

For different gimbals, after adapting to different loads 7 and adjusting the centroid, an extra sealing member 3 may be cut off, and after release papers on both sides of the sealing member 3 are removed, the sealing member 3 is bonded to the arm 1 to implement waterproof and dustproof functions. Therefore, the sealing member 3 only needs to be designed with a single size to adapt to centroid adjustment requirements of different loads 7 and gimbals with different centroids. This is simple and efficient. This type of sealing member 3 disposed does not need to be designed for various types of arms and gimbals for multiple times, and thus has high versatility and high applicability.

In some exemplary embodiments, a mounting slot 14 for mounting the sealing member 3 is disposed on the arm 1, a circumferential dimension of the mounting slot 14 is greater than a circumferential dimension of the clearing slot 13, and a circumferential dimension of the sealing member 3 is greater than the circumferential dimension of the mounting slot 14.

With the mounting slot 14 provided, the firmness of the sealing member 3 mounted on the arm 1 is enhanced. Further, after the sealing member 3 is mounted in the mounting slot 14, an outer surface of the sealing member 3 and an outer surface of the arm 1 on which the sealing member 3 is mounted are flush with each other. This enhances aesthetics of the arm 1. The outer edge dimension of the mounting slot 14 is greater than an outer edge dimension of the clearing slot 13. Therefore, after the sealing member 3 is mounted in the mounting slot 14, the sealing member 3 may fully cover the circumference of the clearing slot 13. A better sealing effect is thus achieved.

In some exemplary embodiments, in a moving direction of the arm 1 relative to the base 2, a size of the sealing member 3 is greater than a size of the mounting slot 14.

For different loads 7, after the centroid of the gimbal is adjusted, a moving distance of the arm 1 relative to the base 2 may be different, and in a moving direction of the arm 1 relative to the base 2, the size of the sealing member 3 is greater than the size of the mounting slot 14, so that the sealing member 3 may still cover the mounting slot 14 when the arm 1 moves different distances relative to the base 2. To improve the appearance of a gimbal, after the arm 1 reaches a preset position, an extra part of the sealing member 3 needs to be removed, so that the outer edge dimension of the sealing member 3 is consistent with the outer edge dimension of the mounting slot 14. Therefore, the sealing member 3 only needs to be designed with a single length to adapt to centroid adjustment requirements of different loads 7 and gimbals with different centroids. This is simple and efficient, and the types of sealing members 3 are reduced.

In some exemplary embodiments, in a direction vertical to a moving direction of the arm 1 relative to the base 2, a size of the sealing member 3 is greater than a size of the mounting slot 14.

In a direction perpendicular to the moving direction of the arm 1 relative to the base 2, the size of the sealing member 3 is greater than the size of the mounting slot 14. Therefore, for the mounting slot 14 and the clearing slot 13 of different sizes, the sealing member 3 may still fully cover the mounting slot 14 and the clearing slot 13 in the direction perpendicular to the moving direction of the arm 1 relative to the base 2. This enhances versatility of the sealing member 3. Therefore, only one type of sealing member 3 needs to be designed to adapt to centroid adjustment requirements of different loads 7 and gimbals with different centroids. This is simple and efficient.

As shown in FIG. 3, the sealing member 3 is strip-shaped. In the moving direction of the arm 1 relative to the base 2 (a length direction of the sealing member 3), a length of the sealing member 3 is greater than a length of the mounting slot 14 and a length of the clearing slot 13.

In some exemplary embodiments, there is one sealing member 3; or the sealing member 3 includes a plurality of sub sealing members, and the plurality of sub sealing members may be joined to cover the clearing slot 13.

There is one sealing member 3, which facilitates covering of the clearing slot 13 by the sealing member 3, connection between the sealing member 3 and the base 2, and connection between the sealing member 3 and the arm 1, thereby improving convenience of operation.

In the case where the sealing member 3 includes a plurality of sub sealing members, the plurality of sub sealing members may be joined to cover the clearing slot 13, and further, the plurality of sub sealing members may be joined so that an outer edge dimension of the sealing member 3 formed by combining the plurality of sub sealing members is not less than an outer edge dimension of the mounting slot 14, thereby enhancing adaptability of the sealing member and effectively avoiding material waste.

In some exemplary embodiments, a first positioning part is disposed on the base 2, a first positioning fitting part corresponding to the first positioning part is disposed on the sealing member 3, and the first positioning part engages with the first positioning fitting part for positioning between the base 2 and the sealing member 3.

The first positioning part engages with the first positioning part to implement positioning between the base 2 and the sealing member 3. In this way, when the centroid of the gimbal is adjusted, the first positioning part and the first positioning part are firstly engaged, and the arm 1 is capable of moving relative to the sealing member 3 and the base 2. After a positional relationship between the arm 1 and the base 2 is determined, that is, after the arm 1 and the base 2 are adjusted to preset positions, the positions of the arm 1 and the base 2 are fixed. This avoids movement of the sealing member 3 or necessity of holding the sealing member 3 with a hand during moving of the arm 1 relative to the base 2 as the sealing member 3 cannot be fixed on the base 2, which may otherwise increase adjustment difficulty of the arm adjustment structure.

The first positioning part includes a positioning protrusion 25 disposed on the base 2, the first positioning fitting part includes a positioning hole 32 disposed on the sealing member 3 and engaging with the positioning protrusion 25, and the positioning protrusion 25 is located in the positioning hole 32.

The first positioning part includes a positioning protrusion 25 formed by the base 2 protruding toward the sealing member 3, the first positioning fitting part includes a positioning hole 32, and the positioning protrusion 25 is inserted into the positioning hole 32. When the sealing member 3 is connected to the base 2, the positioning protrusion 25 and the positioning hole 32 are engaged to implement a positioning function. In this way, the sealing member 3 is positioned on the base 2. In addition, the sealing member 3 and the base 2 may be driven to move together relative to the arm 1, and movement of the sealing member 3 during relative moving of the base 2 and the arm 1 may be avoided.

There may be one or more positioning protrusions 25, a quantity of positioning holes 32 is equal to a quantity of positioning protrusions 25, and the positioning holes 32 correspond to the positioning protrusions 25 on a one-to-one basis. Further, when there are a plurality of positioning protrusions 25, there are a plurality of positioning holes 32, the plurality of positioning protrusions 25 are evenly disposed, and the plurality of positioning holes 32 are also evenly disposed.

The first positioning part includes a positioning hole 32 disposed on the base 2, the first positioning fitting part includes a positioning protrusion 25 disposed on the sealing member 3 and engaging with the positioning hole 32, and the positioning protrusion 25 is located in the positioning hole 32.

The first positioning part includes a positioning hole 32 disposed on the base 2, the first positioning fitting part includes a positioning protrusion 25 formed by the sealing member 3 protruding toward the base 2, and the positioning protrusion 25 is inserted into the positioning hole 32. When the sealing member 3 is connected to the base 2, the positioning protrusion 25 and the positioning hole 32 are engaged to implement a positioning function. In this way, the sealing member 3 is positioned on the base 2. In addition, the sealing member 3 and the base 2 may be driven to move together relative to the arm 1, and movement of the sealing member 3 during relative moving of the base 2 and the arm 1 may be avoided.

There may be one or more positioning protrusions 25, a quantity of positioning holes 32 is equal to a quantity of positioning protrusions 25, and the positioning holes 32 correspond to the positioning protrusions 25 on a one-to-one basis. Further, when there are a plurality of positioning protrusions 25, there are a plurality of positioning holes 32, the plurality of positioning protrusions 25 are evenly disposed, and the plurality of positioning holes 32 are also evenly disposed.

The first positioning part includes a positioning protrusion 25 and a positioning hole 32 disposed on the base 2, the first positioning fitting part includes a positioning hole 32 disposed on the sealing member 3 and engaging with the positioning protrusion 25 on the base 2, and a positioning protrusion 25 disposed on the sealing member 3 and engaging with the positioning hole 32 on the base 2, the positioning protrusion 25 on the base 2 is located in the positioning hole 32 on the sealing member 3, and the positioning hole 32 on the base 2 is located in the positioning protrusion 25 on the sealing member 3. That is, both a positioning protrusion 25 and a positioning hole 32 may be disposed on the base 2, and correspondingly, both a positioning protrusion 25 and a positioning hole 32 may also be disposed on the sealing member 3. In this case, the positioning protrusions 25 and the positioning holes 32 on the base 2 and the sealing member 3 may be disposed alternately or may be disposed at intervals, as long as the corresponding positioning protrusions 25 and positioning holes 32 may be engaged to complete the fixing when the sealing member 3 is fixed on the base 2.

Specifically, the positioning protrusion 25 on the base 2 corresponds to the positioning hole 32 on the sealing member 3, and the positioning hole 32 on the base 2 corresponds to the positioning protrusion 25 on the sealing member 3. The positioning protrusion 25 on the base 2 is inserted into the positioning hole 32 on the sealing member 3, and the positioning protrusion 25 on the sealing member 3 is inserted into the positioning hole 32 on the base 2. When the sealing member 3 is connected to the base 2, the positioning protrusion 25 on the base 2 engages with the positioning hole 32 on the sealing member 3, and the positioning hole 32 on the base 2 engages with the positioning protrusion 25 on the sealing member 3, so as to implement a positioning function. In this way, the sealing member 3 is positioned on the base 2. In addition, the sealing member 3 and the base 2 may be driven to move together relative to the arm 1, and movement of the sealing member 3 during relative moving of the base 2 and the arm 1 may be avoided.

There may be one or more positioning protrusions 25 on the base 2, a quantity of positioning holes 32 on the sealing member 3 is equal to a quantity of positioning protrusions 25, and the positioning holes 32 on the sealing member 3 correspond to the positioning protrusions 25 on a one-to-one basis. Further, when there are a plurality of positioning protrusions 25 on the base 2, there are a plurality of positioning holes 32 on the sealing member 3, the plurality of positioning protrusions 25 on the base 2 are evenly disposed, and the plurality of positioning holes 32 on the sealing member 3 are also evenly disposed.

There may be one or more positioning protrusions 25 on the sealing member 3, a quantity of positioning holes 32 on the base 2 is equal to a quantity of positioning protrusions 25, and the positioning holes 32 on the base 2 correspond to the positioning protrusions 25 on a one-to-one basis. Further, when there are a plurality of positioning protrusions 25 on the sealing member 3, there are a plurality of positioning holes 32 on the base 2, the plurality of positioning protrusions 25 on the sealing member 3 are evenly disposed, and the plurality of positioning holes 32 on the base 2 are also evenly disposed.

In some exemplary embodiments, an adhesive is provided on at least one of the sealing member 3 or the arm 1, so that the sealing member 3 may be bonded to the arm 1.

After the arm 1 is adjusted to a preset position, a release paper on the adhesive is removed, so that the sealing member 3 is bonded to the arm 1 to implement positioning of the sealing member 3 relative to the arm 1, and the sealing member 3 is fixed on the arm 1. Moreover, the bonding manner is simple, the cost is low, and the operation is convenient. The bonding manner may avoid formation of a gap between the sealing member 3 and the arm 1, and further prevent water droplets, dust, and the like from entering the gimbal through a connection between the sealing member 3 and the arm 1.

In some exemplary embodiments, an adhesive is provided on at least one of the sealing member 3 or the base 2, so that the sealing member 3 may be bonded to the base 2.

After the base 2 is adjusted to a preset position, a release paper on the adhesive is removed, so that the sealing member 3 is bonded to the base 2 to implement positioning of the sealing member 3 relative to the base 2, and the sealing member 3 is fixed on the base 2. Moreover, the bonding manner is simple, the cost is low, and the operation is convenient. The bonding manner may avoid formation of a gap between the sealing member 3 and the base 2, and further prevent water droplets, dust, and the like from entering the gimbal through a connection between the sealing member 3 and the base 2.

The following describes some exemplary embodiments of a fourth aspect of this disclosure.

Figure 9:
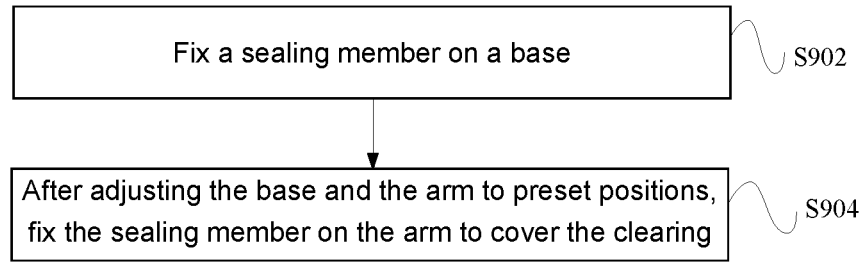
FIG. 9 is a schematic flowchart of a method for mounting a sealing member according to some exemplary embodiments of this disclosure.

As shown in FIG. 9, the embodiment of the fourth aspect of this disclosure provides a method for mounting a sealing member 3. The sealing member 3 is used for an arm adjustment structure, the arm adjustment structure includes a base 2 and an arm 1 movable relative to the base 2, and a clearing slot 13 is disposed on the arm 1. The mounting method includes the following steps.

Step S902: Fix the sealing member 3 on the base 2.

Step S904: After adjusting the base 2 and the arm 1 to preset positions, fix the sealing member 3 on the arm 1 to cover the clearing slot 13.

In step S902, the sealing member 3 is capable of being positioned relative to the base 2. The sealing member 3 may be fixed on the base 2. Therefore, when a centroid of a gimbal is adjusted, the sealing member 3 is fixed on the base 2 first. The arm 1 is capable of moving relative to the sealing member 3 and the base 2. After a positional relationship between the arm 1 and the base 2 is determined, that is, after the arm 1 and the base 2 are adjusted to preset positions, positions of the arm 1 and the base 2 are fixed. This avoids movement of the sealing member 3 or necessity of holding the sealing member 3 with a hand during moving of the arm 1 relative to the base 2 as the sealing member 3 cannot be fixed on the base 2, which may otherwise increase adjustment difficulty of the arm adjustment structure.

In step S904, the sealing member 3 is capable of being positioned relative to the arm 1. After the arm 1 and the base 2 are adjusted to preset positions, the sealing member 3 may be positioned on the arm 1 to enhance firmness of the sealing member 3 disposed, and prevent the clearing slot 13 from being exposed due to moving of the sealing member 3 relative to the arm 1 during use of the gimbal. This further improves waterproof and dustproof performance of the gimbal.

Figure 10:
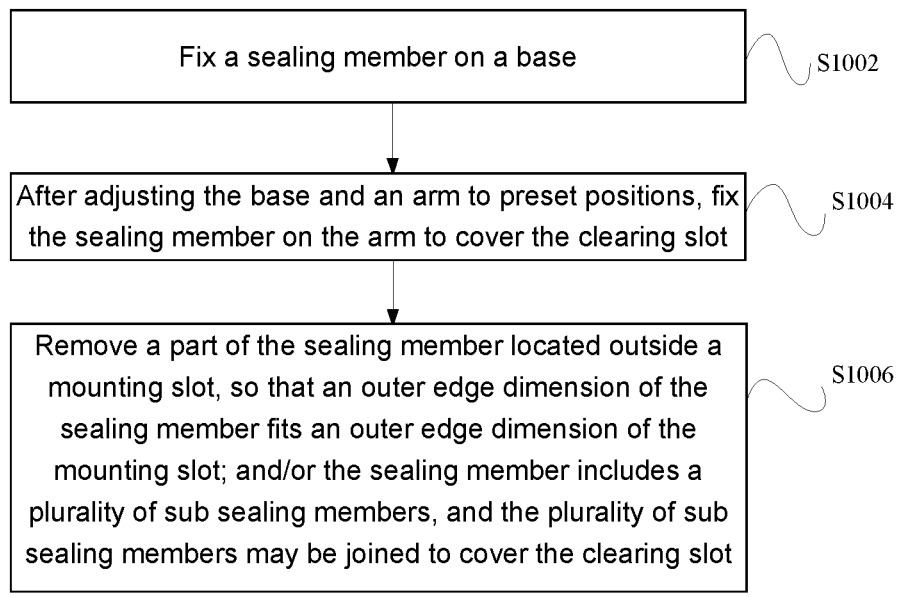
FIG. 10 is a schematic flowchart of a method for mounting a sealing member according to some exemplary embodiments of this disclosure.

As shown in FIG. 10, in some exemplary embodiments, a mounting method includes the following steps.

Step S1002: Fix a sealing member 3 on a base 2.

Step S1004: After adjusting the base 2 and an arm 1 to preset positions, fix the sealing member 3 on the arm 1 to cover the clearing slot 13.

Step S1006: Remove a part of the sealing member 3 that is located outside a mounting slot 14, so that an outer edge dimension of the sealing member 3 engages withfits an outer edge dimension of the mounting slot 14; and/or the sealing member 3 includes a plurality of sub sealing members, and the plurality of sub sealing members may be joined to cover the clearing slot 13.

In step S1006, to improve versatility of the sealing member 3, a circumferential dimension of the sealing member 3 is greater than a circumferential dimension of the mounting slot 14. Therefore, after the sealing member 3 is mounted in the mounting slot 14, the sealing member 3 may fully cover a circumference of the clearing slot 13. To improve the appearance of a gimbal, after the arm 1 reaches a preset position, an extra part of the sealing member 3 needs to be removed, so that the outer edge dimension of the sealing member 3 is consistent with the outer edge dimension of the mounting slot 14. Therefore, the sealing member 3 only needs to be designed with a single length to adapt to centroid adjustment requirements of different loads 7 and gimbals with different centroids. This is simple and efficient, and the types of sealing members 3 may be reduced. If the sealing member 3 includes a plurality of sub sealing members, the plurality of sub sealing members may be joined to cover the clearing slot 13, and further, the plurality of sub sealing members are joined so that the outer edge dimension of the sealing member 3 formed by joining the plurality of sub sealing members is not less than the outer edge dimension of the mounting slot 14. After the arm 1 is adjusted to the preset position, a part of the plurality of sub sealing members beyond the mounting slot 14 may be removed.

Step S1002 of fixing a sealing member 3 on a base 2 specifically includes: engaging a first positioning part on the base 2 with a first positioning fitting part on the sealing member 3 to implement positioning between the base 2 and the sealing member 3; and/or bonding the sealing member 3 to the base 2.

The first positioning part engages with the first positioning part to implement positioning between the base 2 and the sealing member 3. In this way, when a centroid of the gimbal is adjusted, the first positioning part and the first positioning part are firstly engaged, and the arm 1 is capable of moving relative to the sealing member 3 and the base 2. After a positional relationship between the arm 1 and the base 2 is determined, that is, after the arm 1 and the base 2 are adjusted to preset positions, the positions of the arm 1 and the base 2 are fixed. This avoids movement of the sealing member 3 or necessity of holding the sealing member 3 with a hand during moving of the arm 1 relative to the base 2 as the sealing member 3 cannot be fixed on the base 2, which may otherwise increase adjustment difficulty of an arm adjustment structure. The sealing member 3 is bonded to the base 2 to implement positioning of the sealing member 3 relative to the base 2 and fix the sealing member 3 on the base 2. Moreover, the bonding manner is simple, the cost is low, and the operation is convenient. The bonding manner may avoid formation of a gap between the sealing member 3 and the base 2, and further prevent water droplets, dust, and the like from entering the gimbal through a connection between the sealing member 3 and the base 2.

The mounting slot 14 for mounting the sealing member 3 is disposed on the arm 1, and step S1004 of fixing the sealing member 3 on the arm 1 specifically includes: fixing the sealing member 3 in the mounting slot 14.

With the mounting slot 14 provided, firmness of the sealing member 3 mounted on the arm 1 is enhanced. Further, after the sealing member 3 is mounted in the mounting slot 14, an outer surface of the sealing member 3 and an outer surface of the arm 1 on which the sealing member 3 is mounted are flush with each other. This improve the appearance of the arm 1. The outer edge dimension of the mounting slot 14 is larger than an outer edge dimension of the clearing slot 13. Therefore, after the sealing member 3 is mounted in the mounting slot 14, the sealing member 3 may fully cover the circumference of the clearing slot 13.

In some exemplary embodiments, fixing the sealing member 3 in the mounting slot 14 specifically includes: bonding the sealing member 3 into the mounting slot 14.

The sealing member 3 is bonded to the mounting slot 14 to implement positioning of the sealing member 3 relative to the arm 1 and fix the sealing member 3 on the arm 1. Moreover, the bonding manner is simple, the cost is low, and the operation is convenient. The bonding manner may avoid formation of a gap between the sealing member 3 and the arm 1, and further prevent water droplets, dust, and the like from entering the gimbal through a joint between the sealing member 3 and the arm 1.

The following describes some exemplary embodiments of a fifth aspect of this disclosure.

The embodiment of the fifth aspect of this disclosure provides a coaxial cable 5. The coaxial cable 5 is used for an arm adjustment structure. The arm adjustment structure includes a base 2 and an arm 1 moving relative to the base 2. A clearing slot 13 is disposed on the arm 1. The coaxial cable 5 is capable of passing through the clearing slot 13. The coaxial cable 5 includes a coaxial cable body 51 and a bending portion 52 connected to the coaxial cable body 51. The bending portion 52 bends in a moving direction of the arm 1 relative to the base 2.

The coaxial cable 5 includes the bending portion 52. Because the bending portion 52 is capable of bending, the bending portion 52 has deformability. In addition, since the bending portion 52 bends in the moving direction of the arm 1 relative to the base 2, the bending portion 52 is capable of deforming in the moving direction of the arm 1 relative to the base 2. Therefore, the bending portion 52 may move with the arm 1 relative to the base 2 and continue to bend or extend, so that a pre-deformation direction of the coaxial cable 5 is consistent with the moving direction of the arm 1 relative to the base 2.

During moving of the arm 1 relative to the base 2, the bending portion 52 tends to deform with moving of the arm 1 relative to the base 2, that is, the coaxial cable 5 has relatively large deformation at the bending portion 52 and has relatively small deformation at the coaxial main body 51. Therefore, the coaxial cable 5 as a whole is prevented from randomly swinging, which may otherwise cause wire pileup and entanglement. In other words, the bending portion 52 forms a pre-folded portion on the coaxial cable 5. The coaxial cable 5 is pre-folded, so that the coaxial cable 5 has a pre-deformation direction during an adjustment of the arm 1 relative to the base 2 to prevent wire pileup.

Further, the arm adjustment structure includes a waterproof member, where the waterproof member is suitable for covering the clearing slot 13, and is used for covering the clearing slot 13. A second through hole 31 for the coaxial cable 5 to pass through is disposed on the clearing slot 13.

In some exemplary embodiments, the base 2 includes a base body 23, the bending portion 52 is suitable for being disposed on a side of the arm 1 facing away from the base body 23, and the bending portion 52 is disposed near the clearing slot 13.

The bending portion 52 is disposed on the side of the arm 1 facing away from the base body 23, so that the bending portion 52 does not affect assembly of the base 2 and the arm 1. When the coaxial cable 5 moves in the clearing slot 13 with moving of the arm 1 relative to the base 2, the bending portion 52 approaches the clearing slot 13, that is, the bending portion 52 is close to the clearing slot 13, so that the bending portion 52 easily deforms and thus the coaxial cable 5 has a pre-deformation direction.

In some exemplary embodiments, the coaxial cable body 51 includes a first connection segment 511 and a second connection segment 512, the first connection segment 511 is suitable for being disposed in the clearing slot 13, the second connection segment 512 is disposed corresponding to the arm 1, the bending portion 52 is suitable for being disposed at a joint between the first connection segment 511 and the second connection segment 512, and the bending portion 52 bends in a direction facing away from the second connection segment 512.

Along a length direction of the coaxial cable 5, the first connection segment 511, the bending portion 52 and the second connection segment 512 are disposed in sequence. The bending portion 52 is disposed at the joint between the first connection segment 511 and the second connection segment 512, so that the bending portion 52 is located on the side of the arm 1 facing away from the base body 23 and is disposed near the clearing slot 13.

The bending portion bends in the direction facing away from the second connection segment 512, so that the bending portion 52 does not affect the engagement between the second connection segment 512 and the arm 1, and allows the bending portion 52 to have a relatively large deformation space.

In some exemplary embodiments, a bending angle exists between the bending portion 52 and the first connection segment 511.

The bending angle is arranged to increase strength of a joint between the bending portion 52 and the first connection segment 511, thus the joint between the bending portion 52 and the first connection segment 511 is unlikely to deform. Therefore, it is ensured that deformation mainly occurs in the bending portion 52 during moving of the arm 1 relative to the base 2.

In some exemplary embodiments, the bending angle between the bending portion 52 and the first connection segment 511 is 90°. This may not only ensure that the joint between the bending portion 52 and the first connection segment 511 has sufficient resistance to deformation, but also facilitate shaping of the coaxial cable 5.

Further, a transition arc is arranged at the joint between the bending portion 52 and the first connection segment 511 to avoid stress from concentrating at the joint to damage the joint.

In some exemplary embodiments, the bending portion 52 includes a first bending segment 521 and a second bending segment 522 that are connected and disposed opposite to each other, and orthogonal projections of the first bending segment 521 and the second bending segment 522 on a horizontal plane at least partially overlap. The first bending segment 521 and the second bending segment 522 may be coaxial cable segments whose axes are respectively arranged in straight lines, as shown in FIG. 6. Alternatively, the first bending segment 521 and the second bending segment 522 may be coaxial cable segments whose axes are respectively not arranged in straight lines, for example, wavy lines or broken lines. This is not limited herein.

The first bending segment 521 and the second bending segment 522 are disposed opposite to each other, and their orthogonal projections on the horizontal plane at least partially overlap. Therefore, a joint between the first bending segment 521 and the second bending segment 522 has strong deformability and easily deforms during moving of the arm 1 relative to the base 2, so as to avoid large-scale swinging of other parts of the coaxial cable 5.

The orthogonal projections of the first bending segment 521 and the second bending segment 522 on the horizontal plane at least partially overlap. For example, the first bending segment 521 and the second bending segment 522 are disposed along an up-down direction and are parallel to each other, or the first bending segment 521 and the second bending segment 522 are disposed along an up-down direction and a small angle exists therebetween. This further satisfies a bending requirement of the coaxial cable while reducing a wiring length.

In some exemplary embodiments, the first bending segment 521 and the second bending segment 522 are disposed in parallel.

The first bending segment 521 and the second bending segment 522 are disposed in parallel to further enhance deformability of the joint between the first bending segment 521 and the second bending segment 522.

In some exemplary embodiments, the bending portion 52 includes a transition segment 523, where the transition segment 523 is disposed between the first bending segment 521 and the second bending segment 522, and the transition segment 523 is curved.

The transition segment 523 is curved, so that the transition segment 523 has strong deformability. When the coaxial cable 5 moves in the clearing slot 13, the first connection segment 511 or the second connection segment 512 easily drives the transition segment 523 to move, so as to avoid large deformation of other parts than the transition segment 523 of the coaxial cable 5.

In some exemplary embodiments, a circular arc transition is provided at a joint between the transition segment 523 and the first bending segment 521, so that the joint between the transition segment 523 and the first bending segment 521 has strong deformability and that the transition segment 523 has strong deformability.

In some exemplary embodiments, a circular arc transition is provided at a joint between the transition segment 523 and the second bending segment 522, so that the joint between the transition segment 523 and the second bending segment 522 has strong deformability and that the transition segment 523 has strong deformability.

In some exemplary embodiments, the rigidity of the coaxial cable body 51 is higher than the rigidity of the bending portion 52. In other words, the flexibility of the coaxial cable body 51 is lower than the flexibility of the bending portion 52. Therefore, the coaxial cable body 51 has strong resistance to deformation and is unlikely to deform, but the bending portion 52 has weak resistance to deformation and is likely to deform. It is further ensured that during moving of the arm 1 relative to the base 2, the deformation of the coaxial cable 5 mainly occurs at the bending portion 52.

In some exemplary embodiments, a sheath (wrapping material) of the coaxial cable 5 at the coaxial cable body 51 is an acetate tape, and a sheath (wrapping material) of the coaxial cable 5 at the bending portion 52 is a nano tape.

For the selection of the wrapping material for the coaxial cable 5, the acetate tape has high rigidity and a lower cost, and also has high abrasion resistance. The nano tape has high flexibility and a high cost but is prone to wear during use. The bending portion 52 requires a large amount of deformation, and the bending portion 52 is short in length. Therefore, the bending portion 52 uses the nano tape, and the coaxial cable body 51 uses the acetate tape. This may ensure good bending performance of the bending portion 52, and may also reduce the cost of the coaxial cable 5.

The following describes some exemplary embodiments of a sixth aspect of this disclosure.

The embodiment of the sixth aspect of this disclosure provides a gimbal. The gimbal includes an arm adjustment structure. The arm adjustment structure includes: a base 2; an arm 1 capable of moving relative to the axle base, where a clearing slot 13 is disposed on the axle arm; and a sealing member 3, disposed between the axle base and the axle arm, and located at the clearing slot 13 to cover the clearing slot 13.

The arm 1 is capable of moving relative to the base 2, so that a centroid of the gimbal may be adjusted to adapt to a variety of different types of loads 7 such as a lidar and a multispectral camera. While the centroid of the gimbal is made adjustable, a sealing member 3 is disposed between the base 2 and the arm 1, and the sealing member 3 is capable of being located at the clearing slot 13 to cover the clearing slot 13, so as to prevent the clearing slot 13 from being exposed, and prevent foreign matters such as water droplets, sand, and dust from entering the gimbal through the clearing slot 13 and affecting normal use of the gimbal. Therefore, the sealing member 3 has waterproof and dustproof functions, and may improve use reliability of the gimbal.

The gimbal may be used as a supporting device for a variety of devices, such as a photographing device, a security camera, or an infrared thermal imaging camera. The gimbal has at least one axis of rotation. Each axis of rotation is controlled by an independent motor. Through combined regulation on a plurality of motors, stable, smooth and multi-angle photographing of a device such as a camera may be implemented.

In some exemplary embodiments, the gimbal includes at least one axis, the base 2 includes an axle base, and the arm 1 includes an axle arm.

In a specific embodiment, as shown in FIG. 1, the gimbal includes two axes, the base 2 includes a yaw axle base 21 and a roll axle base 22, and the arm 1 includes a yaw axle arm 11 and a roll axle arm 12. The yaw axle base 21 is connected to a body of a mobile device, and becomes a fixed base part of the whole gimbal.

The yaw axle arm 11 moves relative to the yaw axle base 21, and a clearing slot 13A is disposed on the yaw axle arm 11. A sealing member disposed between the yaw axle arm 11 and the yaw axle base 21 is a sealing member 3A, and the sealing member 3A is capable of being located at the clearing slot 13A to cover the clearing slot 13A. The roll axle arm 12 moves relative to the roll axle base 22, and a clearing slot 13B is disposed on the roll axle arm 12. A sealing member disposed between the roll axle arm 11 and the roll axle base 21 is a sealing member 3B, and the sealing member 3B is capable of being located at the clearing slot 13B to cover the clearing slot 13B. To conveniently measure the motion of the yaw axle arm 11 relative to the yaw axle base 21, a scale line 6A is provided on the yaw axle arm 11. To conveniently measure the motion of the roll axle arm 12 relative to the roll axle base 22, a scale line 6B is provided on the roll axle arm 12.

In some exemplary embodiments, as shown in FIG. 3 and FIG. 4, the sealing member 3 is capable of being positioned relative to the base 2.

The sealing member 3 may be fixed on the base 2. Therefore, when the centroid of the gimbal is adjusted, the sealing member 3 is firstly fixed on the base 2, and the arm 1 is capable of moving relative to the sealing member 3 and the base 2. After a positional relationship between the arm 1 and the base 2 is determined, that is, after the arm 1 is adjusted to a preset position relative to the base 2, positions of the arm 1 and the base 2 are fixed. This avoids movement of the sealing member 3 or necessity of holding the sealing member 3 with a hand during moving of the arm 1 relative to the base 2 as the sealing member 3 cannot be fixed on the base 2, which may otherwise increase adjustment difficulty of the arm adjustment structure.

Further, the sealing member 3A is capable of being positioned relative to the yaw axle base 21, and the sealing member 3B is capable of being positioned relative to the roll axle base 22.

In some exemplary embodiments, a first positioning part is disposed on the base 2, a first positioning fitting part corresponding to the first positioning part is disposed on the sealing member 3, and the first positioning part engages with the first positioning fitting part for positioning between the base 2 and the sealing member 3.

The first positioning part engages with the first positioning part to implement positioning between the base 2 and the sealing member 3. In this way, when the centroid of the gimbal is adjusted, the first positioning part and the first positioning part are firstly engaged, and the arm 1 is capable of moving relative to the sealing member 3 and the base 2. After a positional relationship between the arm 1 and the base 2 is determined, that is, after the arm 1 and the base 2 are adjusted to preset positions, the positions of the arm 1 and the base 2 are fixed. This avoids movement of the sealing member 3 or necessity of holding the sealing member 3 with a hand during moving of the arm 1 relative to the base 2 as the sealing member 3 cannot be fixed on the base 2, which may otherwise increase adjustment difficulty of the arm adjustment structure.

Further, a first positioning part is disposed on the yaw axle base 21, a first positioning fitting part corresponding to the first positioning part is disposed on the sealing member 3A, and the first positioning part engages with the first positioning fitting part for positioning between the yaw axle base 21 and the sealing member 3A. A first positioning part is disposed on the roll axle base 22, a first positioning fitting part corresponding to the first positioning part is disposed on the sealing member 3B, and the first positioning part engages with the first positioning fitting part for positioning between the roll axle base 22 and the sealing member 3B.

The first positioning part includes a positioning protrusion 25 disposed on the base 2, the first positioning fitting part includes a positioning hole 32 disposed on the sealing member 3 and engaging with the positioning protrusion 25, and the positioning protrusion 25 is located in the positioning hole 32. As shown in FIG. 3, a positioning protrusion disposed on the yaw axle base 21 is a positioning protrusion 25A, a positioning protrusion disposed on the roll axle base 22 is 25B, and there are two positioning protrusions 25B; a positioning hole disposed on the sealing member 3A is a positioning hole 32A, and a positioning hole disposed on the sealing member 3B is a positioning hole 32B.

The first positioning part includes a positioning protrusion 25 formed by the base 2 protruding toward the sealing member 3, the first positioning fitting part includes a positioning hole 32, and the positioning protrusion 25 is inserted into the positioning hole 32. When the sealing member 3 is connected to the base 2, the positioning protrusion 25 and the positioning hole 32 are engaged to implement a positioning function. In this way, the sealing member 3 is positioned on the base 2. In addition, the sealing member 3 and the base 2 may be driven to move together relative to the arm 1, and movement of the sealing member 3 during relative moving of the base 2 and the arm 1 may be avoided.

There may be one or more positioning protrusions 25, a quantity of positioning holes 32 is equal to a quantity of positioning protrusions 25, and the positioning holes 32 correspond to the positioning protrusions 25 on a one-to-one basis. Further, when there are a plurality of positioning protrusions 25, there are a plurality of positioning holes 32, the plurality of positioning protrusions 25 are evenly disposed, and the plurality of positioning holes 32 are also evenly disposed.

The first positioning part includes a positioning hole 32 disposed on the base 2, the first positioning fitting part includes a positioning protrusion 25 disposed on the sealing member 3 and engaging with the positioning hole 32, and the positioning protrusion 25 is located in the positioning hole 32.

The first positioning part includes a positioning hole 32 disposed on the base 2, the first positioning fitting part includes a positioning protrusion 25 formed by the sealing member 3 protruding toward the base 2, and the positioning protrusion 25 is inserted into the positioning hole 32. When the sealing member 3 is connected to the base 2, the positioning protrusion 25 and the positioning hole 32 are engaged to implement a positioning function. In this way, the sealing member 3 is positioned on the base 2. In addition, the sealing member 3 and the base 2 may be driven to move together relative to the arm 1, and movement of the sealing member 3 during relative moving of the base 2 and the arm 1 may be avoided.

There may be one or more positioning protrusions 25, a quantity of positioning holes 32 is equal to a quantity of positioning protrusions 25, and the positioning holes 32 correspond to the positioning protrusions 25 on a one-to-one basis. Further, when there are a plurality of positioning protrusions 25, there are a plurality of positioning holes 32, the plurality of positioning protrusions 25 are evenly disposed, and the plurality of positioning holes 32 are also evenly disposed.

The first positioning part includes a positioning protrusion 25 and a positioning hole 32 disposed on the base 2, the first positioning fitting part includes a positioning hole 32 disposed on the sealing member 3 and engaging with the positioning protrusion 25 on the base 2 and a positioning protrusion 25 disposed on the sealing member 3 and engaging with the positioning hole 32 on the base 2, the positioning protrusion 25 on the base 2 is located in the positioning hole 32 on the sealing member 3, and the positioning hole 32 on the base 2 is located in the positioning protrusion 25 on the sealing member 3. That is, both a positioning protrusion 25 and a positioning hole 32 may be disposed on the base 2, and correspondingly, both a positioning protrusion 25 and a positioning hole 32 may also be disposed on the sealing member 3. In this case, the positioning protrusions 25 and the positioning holes 32 on the base 2 and the sealing member 3 may be disposed alternately or may be disposed at intervals, as long as the corresponding positioning protrusions 25 and positioning holes 32 may be engaged to complete the fixing when the sealing member 3 is fixed on the base 2.

Specifically, the positioning protrusion 25 on the base 2 corresponds to the positioning hole 32 on the sealing member 3, and the positioning hole 32 on the base 2 corresponds to the positioning protrusion 25 on the sealing member 3. The positioning protrusion 25 on the base 2 is inserted into the positioning hole 32 on the sealing member 3, and the positioning protrusion 25 on the sealing member 3 is inserted into the positioning hole 32 on the base 2. When the sealing member 3 is connected to the base 2, the positioning protrusion 25 on the base 2 engages with the positioning hole 32 on the sealing member 3 and the positioning hole 32 on the base 2 engages with the positioning protrusion 25 on the sealing member 3 to implement a positioning function. In this way, the sealing member 3 is positioned on the base 2. In addition, the sealing member 3 and the base 2 may be driven to move together relative to the arm 1, and motion of the sealing member 3 during relative moving of the base 2 and the arm 1 may be avoided.

There may be one or more positioning protrusions 25 on the base 2, a quantity of positioning holes 32 on the sealing member 3 is equal to a quantity of positioning protrusions 25, and the positioning holes 32 on the sealing member 3 correspond to the positioning protrusions 25 on a one-to-one basis. Further, when there are a plurality of positioning protrusions 25 on the base 2, there are a plurality of positioning holes 32 on the sealing member 3, the plurality of positioning protrusions 25 on the base 2 are evenly disposed, and the plurality of positioning holes 32 on the sealing member 3 are also evenly disposed.

There may be one or more positioning protrusions 25 on the sealing member 3, a quantity of positioning holes 32 on the base 2 is equal to a quantity of positioning protrusions 25, and the positioning holes 32 on the base 2 correspond to the positioning protrusions 25 on a one-to-one basis. Further, when there are a plurality of positioning protrusions 25 on the sealing member 3, there are a plurality of positioning holes 32 on the base 2, the plurality of positioning protrusions 25 on the sealing member 3 are evenly disposed, and the plurality of positioning holes 32 on the base 2 are also evenly disposed.

In some exemplary embodiments, at least one of the positioning protrusion 25 or the positioning hole 32 is surrounded by a sealing gasket 4. As shown in FIG. 4 and FIG. 5, a sealing gasket disposed between the sealing member 3A and the yaw axle base 21 is a sealing gasket 4A, and a sealing gasket disposed between the sealing member 3B and the roll axle base 22 is a sealing gasket 4B.

The sealing gasket 4 is disposed around the positioning protrusion 25 and/or the positioning hole 32 to implement sealing between the base 2 and the sealing member 3 around the positioning protrusion 25 and/or the positioning hole 32, and prevent disposition of the positioning protrusion 25 and the positioning hole 32 from causing a gap between the base 2 and the sealing member 3.

In some exemplary embodiments, the sealing member 3 is capable of being bonded to the base 2. For example, the sealing member 3A is capable of being bonded to the yaw axle base 21, and the sealing member 3B is capable of being bonded to the roll axle base 22.

The sealing member 3 is bonded to the base 2 to implement positioning of the sealing member 3 relative to the base 2 and fix the sealing member 3 on the base 2. Moreover, the bonding manner is simple, the cost is low, and the operation is convenient. The bonding manner may avoid formation of a gap between the sealing member 3 and the base 2, and further prevent water droplets, dust, and the like from entering the gimbal through a connection between the sealing member 3 and the base 2.

In some exemplary embodiments, the sealing member 3 is capable of being positioned relative to the arm 1. For example, the sealing member 3A is capable of being positioned by the yaw axle arm 11, and the sealing member 3B is capable of being positioned by the roll axle arm 12.

After the arm 1 and the base 2 are adjusted to preset positions, the sealing member 3 may be positioned on the arm 1 to enhance firmness of the sealing member 3 disposed, and prevent the clearing slot 13 from being exposed due to moving of the sealing member 3 relative to the arm 1 during use of the gimbal. This further improves waterproof and dustproof performance of the gimbal.

Regarding an implementation of the sealing member 3 capable of being positioned relative to the arm 1, in a specific embodiment, a second positioning part is disposed on the arm 1, a second positioning fitting part corresponding to the second positioning part is disposed on the sealing member 3, and the second positioning part engages with the second positioning fitting part for positioning between the arm 1 and the sealing member 3. Further, a second positioning part is disposed on the yaw axle arm 11, a second positioning fitting part corresponding to the second positioning part is disposed on the sealing member 3A, and the second positioning part engages with the second positioning fitting part for positioning between the yaw axle arm 11 and the sealing member 3A. A second positioning part is disposed on the roll axle arm 12, a second positioning fitting part corresponding to the second positioning part is disposed on the sealing member 3B, and the second positioning part engages with the second positioning fitting part for positioning between the roll axle arm 12 and the sealing member 3B.

The second positioning part engages with the second positioning fitting part, so that the sealing member 3 may be fixed on the arm 1. In this way, the sealing member 3 is prevented from being misaligned with the clearing slot 13, which may otherwise cause foreign matters such as water droplets and dust to enter the gimbal through the clearing slot 13.

The second positioning part includes a positioning column disposed on the arm 1, and the second positioning fitting part includes a positioning slot disposed on the sealing member 3 and corresponding to the positioning column; and/or the second positioning part includes a positioning slot disposed on the arm 1, and the second positioning fitting part includes a positioning column disposed on the sealing member 3 and corresponding to the positioning slot. Certainly, both a positioning column and a positioning slot may also be disposed on the arm 1, and correspondingly, both a positioning column and a positioning slot may also be disposed on the sealing member 3. In this case, the positioning columns and the positioning slots on the arm 1 and the sealing member 3 may be disposed alternately or may be disposed at intervals, as long as the corresponding positioning columns and positioning slots may be engaged to complete the fixing when the sealing member 3 is fixed on the arm 1. To improve sealing performance at an engaging location between the positioning column and the positioning slot, a sealing gasket is disposed around the positioning column and/or the positioning slot.

In some exemplary embodiments, the sealing member 3 is capable of being bonded to the arm 1. For example, the sealing member 3A is capable of being bonded to the yaw axle arm 11, and the sealing member 3B is capable of being bonded to the roll axle arm 12.

The sealing member 3 is bonded to the arm 1 to implement positioning of the sealing member 3 relative to the arm 1 and fix the sealing member 3 on the arm 1. Moreover, the bonding manner is simple, the cost is low, and the operation is convenient. The bonding manner may avoid formation of a gap between the sealing member 3 and the arm 1, and further prevent water droplets, dust, and the like from entering the gimbal through a connection between the sealing member 3 and the arm 1.

In some exemplary embodiments, the arm adjustment structure includes: a base 2 including a base body 23 and a base cover 24, the base body 23 and the base cover 24 define a mounting space, and the arm 1 is confined in the mounting space.

Since the arm 1 is confined in the mounting space, positioning of the arm 1 relative to the base 2 is implemented, and moving of the arm 1 relative to the base 2 during use of the gimbal is avoided.

The base body 23 and the base cover 24 may be detachably connected, for example, connected via a screw 8 or through clamping. When the centroid of the gimbal needs to be adjusted, the base body 23 is separated from the base cover 24, and the arm 1 moves relative to the base body 23. When the arm 1 is adjusted to a preset position relative to the base body 23, the base cover is mounted on the base body 23 to lock the arm 1, and the arm 1 is thus confined in the mounting space defined by the base body 23 and the base cover 24.

Further, the sealing member 3 is disposed between the base body 23 and the arm 1.

For example, as shown in FIG. 1, the yaw axle base 21 includes a base body 23A and a base cover 24A, the base body 23A and the base cover 24A define a mounting space, and the yaw axle arm 11 is confined in the mounting space.

The roll axle base 22 includes a base body 23B and a base cover 24B, the base body 23B and the base cover 24B define a mounting space, and the roll axle arm 12 is confined in the mounting space. The sealing member 3A is disposed between the base body 23A and the yaw axle arm 11, and the sealing member 3B is disposed between the base body 23B and the roll axle arm 12. In other words, the base cover 24A may be combined with the yaw axle base to lock the yaw axle arm and the sealing member 3A on the yaw axle arm, and the base cover 24B may be combined with the roll axle base to lock the roll axle arm and the sealing member 3B on the roll axle arm.

In some exemplary embodiments, the clearing slot 13 is partially or fully located in the mounting space, and the sealing member 3 is partially or fully located in the mounting space, so that the sealing member 3 is confined in the mounting space.

The clearing slot 13 is at least partially located in the mounting space, and the sealing member 3 covers the clearing slot 13, so that the sealing member 3 is at least partially located in the mounting space. The sealing member 3 is confined in the mounting space, so that firmness of positioning between the sealing member 3 and the base 2 and between the sealing member 3 and the arm 1 is further achieved.

In some exemplary embodiments, a mounting slot 14 for mounting the sealing member 3 is disposed on the arm 1, and a circumferential dimension of the mounting slot 14 is greater than a circumferential dimension of the clearing slot 13. As shown in FIG. 2, a mounting slot 14A for mounting the sealing member 3A is disposed on the yaw axle arm 11, and after a release paper on the sealing member 3A is removed, the sealing member 3A may be attached in the mounting slot 14A and tightly fits onto the yaw axle arm 11. A circumferential dimension of the mounting slot 14A is greater than a circumferential dimension of the clearing slot 13A; and a mounting slot 14B for mounting the sealing member 3B is disposed on the roll axle arm 12. After a release paper on the sealing member 3B is removed, the sealing member 3B may be attached in the mounting slot 14B and tightly fits onto the roll axle arm 12, and a circumferential dimension of the mounting slot 14B is greater than a circumferential dimension of the clearing slot 13B.

The mounting slot provided may make the sealing member tightly fit onto the arm. The circumferential dimension of the mounting slot 14 is greater than the circumferential dimension of the clearing slot 13. Therefore, after the sealing member 3 is disposed in the mounting slot 14, a circumference of the clearing slot 13 may be sealed to enhance a sealing effect of the sealing member 3 on the clearing slot 13, and it is also easier to mount and align the sealing member 3. In addition, this may avoid a sealing failure from occurring when the sealing member 3 enters the clearing slot 13 as a size of the clearing slot 13 is the same as a size of the mounting slot 14, or a size of the clearing slot 13 is greater than a size of the mounting slot 14.

In some exemplary embodiments, the arm adjustment structure further includes an electrical connection member that passes through the clearing slot 13.

The clearing slot 13 is disposed on the arm 1. The electrical connection member passes through the clearing slot 13. Thus, when the arm 1 moves relative to the base 2, the electrical connection member moves in the clearing slot 13 with the arm 1 relative to the clearing slot 13. Therefore, the clearing slot 13 may provide a clear space for electrical connection member, and does not affect connection reliability of the electrical connection member when the arm 1 moves relative to the base 2.

In some exemplary embodiments, as shown in FIG. 6, the electrical connection member includes a first electrical connection member 101, and the first electrical connection member 101 is capable of being partially positioned relative to the arm 1. Further, the first electrical connection member 101 is capable of being partially positioned relative to the yaw axle arm 11.

The first electrical connection member 101 is capable of being partially positioned relative to the arm 1, and during moving of the arm 1 relative to the base 2, the first electrical connection member 101 is prevented from swinging randomly.

Further, the electrical connection member further includes a second electrical connection member 102. The first electrical connection member 101 is capable of being partially positioned relative to the arm 1, and during moving of the arm 1 relative to the base 2, the first electrical connection member 101 may be prevented from swinging randomly, which may otherwise cause entanglement or wear with the second electrical connection member 102.

In some exemplary embodiments, the first electrical connection member 101 is capable of being bonded to an inner side of the arm 1.

The first electrical connection member 101 is partially located in the arm 1 and bonded to the inner side of the arm 1 to implement positioning between the first electrical connection member 101 and the arm 1 and prevent the first electrical connection member 101 from swinging randomly with the arm 1. Moreover, the bonding manner is simple in operation, and low in cost.

An adhesive may be provided on an inner side of the first electrical connection member 101 or the arm 1. After a release paper of the adhesive is removed, the first electrical connection member 101 is bonded to the inner side of the arm 1. It may be understood that an adhesive may also be applied to the first electrical connection member 101 or the inner side of the arm 1 to implement bonding therebetween.

In some exemplary embodiments, the first electrical connection member 101 is capable of being positioned relative to the base 2.

The first electrical connection member 101 is capable of being partially positioned relative to the base 2, and during moving of the arm 1 relative to the base 2, the first electrical connection member 101 is prevented from swinging randomly.

In some exemplary embodiments, the first electrical connection member 101 is capable of being bonded to an inner side of the base 2.

The first electrical connection member 101 is partially located in the base 2 and bonded to the base 2 to implement positioning between the first electrical connection member 101 and the base 2 and prevent the first electrical connection member 101 from swinging randomly with the arm 1. Moreover, the bonding manner is simple in operation, and low in cost.

An adhesive may be provided on the first electrical connection member 101 or the base 2. After a release paper of the adhesive is removed, the first electrical connection member 101 is bonded to the base 2. It may be understood that an adhesive may also be applied to the first electrical connection member 101 or the base 2 to implement bonding therebetween.

As shown in FIG. 6, the first electrical connection member 101 includes an upper end portion and a lower end portion that are disposed opposite to each other, an adhesive 9A is provided on the upper end portion so that the upper end portion of the first electrical connection member 101 is bonded to the yaw axle base 21, and an adhesive 9B is provided on the lower end portion so that the lower end portion of the first electrical connection member 101 is bonded to an inner wall of the yaw axle arm 11.

In some exemplary embodiments, the electrical connection member includes at least one of an FPC cable, a coaxial cable 5, or a flexible flat cable.

The electrical connection member may connect a load 7 to a motor. The FPC cable, the coaxial cable 5, and the flexible flat cable may all connect the load 7 to the motor. Further, the first electrical connection member 101 is an FPC cable (FPC flat cable), and the second electrical connection member 102 is a coaxial cable 5.

In some exemplary embodiments, a through hole 31 provided for the electrical connection member to pass through is disposed on the sealing member 3.

The through hole 31 is disposed on the sealing member 3, and the electrical connection member(s) may pass through the through hole 31. Therefore, disposition of the sealing member 3 does not affect a normal connection of the electrical connection member.

Further, the through hole 31 includes a through hole 31A provided for the first electrical connection member 101 to pass through and a through hole 31B provided for the second electrical connection member 102 to pass through. To maintain integrity of the sealing member 3 as much as possible and enhance waterproof and dustproof performance of the sealing member 3, if a positioning protrusion 25 is disposed on the base 2 and a positioning hole 32A is disposed on the sealing member 3A, the through hole 31A may be connected to the positioning hole 32A, so that the through hole 31A and the positioning hole 32A are combined into one hole, and that a quantity of holes opened on the sealing member 3 is minimized.

In some exemplary embodiments, a first sealing component is disposed between the sealing member 3 and the base 2, and the first sealing component is used for sealing between the sealing member 3 and the base 2. For example, a first sealing component is disposed between the sealing member 3A and the yaw axle base 21, and the first sealing component is used for sealing between the sealing member 3A and the yaw axle base 21; and a first sealing component is disposed between the sealing member 3B and the roll axle base 22, and the first sealing component is used for sealing between the sealing member 3B and the roll axle base 22.

When the base cover 24 is connected to the base body 23 and the arm adjustment structure is locked, the first sealing component may fill a gap between the sealing member 3 and the base 2 to prevent water droplets, sand, and dust from entering the gimbal through the gap.

Further, the first sealing component may be a sealing gasket 4 or a waterproof gasket.

In some exemplary embodiments, the first sealing component is bonded to the sealing member 3.

The bonding between the first sealing component and the sealing member 3 may enhance the strength of a connection between the first sealing component and the sealing member 3. Moreover, the bonding manner is simple in operation, and low in cost. The bonding may further avoid formation of a gap between the first sealing component and the sealing member 3.

An adhesive may be disposed on the first sealing component or the sealing member 3 to implement bonding therebetween. Alternatively, a glue may be applied on the first sealing component or the sealing member 3 to implement bonding therebetween.

In some exemplary embodiments, the first sealing component is bonded to the base 2.

The bonding between the first sealing component and the base 2 may enhance strength of a connection between the first sealing component and the base 2. Moreover, the bonding manner is simple in operation, and low in cost. The bonding may further avoid formation of a gap between the first sealing component and the base 2.

An adhesive may be disposed on the first sealing component or the base 2 to implement bonding therebetween. Alternatively, a glue is applied on the first sealing component or the base 2 to implement bonding therebetween.

In some exemplary embodiments, the first sealing component is disposed on an outer side of the through hole 31. The first sealing component between the sealing member 3A and the yaw axle base 21 is located on an outer side of the through hole 31A and an outer side of the through hole 31B. The first sealing component between the sealing member 3B and the roll axle base 22 is located on the outer side of the through hole 31B and an outer side of the positioning hole 32B.

Since the first sealing component is located on the outer side of the through hole 31, the through hole 31 is located inside a sealed area jointly enclosed by the first sealing component, the sealing member 3, and the base 2 to prevent water droplets, dust, and the like from entering the gimbal through the through hole 31.

Further, the first sealing component is located on an outer side of a first through hole 31 and an outer side of a second through hole 31.

In some exemplary embodiments, the first sealing component includes one or more sealing gaskets 4, and the through hole 31 is surrounded by the sealing gasket(s) 4.

A quantity, size(s), and shape(s) of first sealing components may be properly set according to shapes and sizes of the base 2 and the sealing member 3, so that the first sealing components may be disposed conveniently.

When the first sealing component includes a sealing gasket 4, the sealing gasket 4 is ring-shaped and sleeved over the outer side of the through hole 31. When the first sealing component is a plurality of sealing gaskets 4, the plurality of sealing gaskets 4 are disposed around the through hole 31.

As shown in FIG. 4, the first sealing component between the sealing member 3A and the yaw axle base 21 is a plurality of sealing gaskets 4, and the first sealing component between the sealing member 3B and the roll axle base 22 is one sealing gasket 4. Specifically, a quantity of first sealing components disposed between the sealing member 3 and the yaw axle base 21 is three, among them, two are disposed near the positioning protrusion 25A and located on two opposing sides of the positioning protrusion 25A, and another first sealing component is disposed on one side of the yaw axle base 21 opposite to the positioning protrusion 25A. One first sealing component is disposed between the sealing member 3 and the roll axle base 22 and is ring-shaped.

In some exemplary embodiments, a hollow structure is disposed on the base 2, the electrical connection member passes through the hollow structure, a second sealing component is disposed between the electrical connection member and the hollow structure, and the second sealing component is used for sealing between the electrical connection member and the hollow structure.

The second sealing component is used to fill the electrical connection member and the hollow structure to implement sealing between the electrical connection member and the hollow structure. While internal wiring of the hollow structure is implemented, water droplets and dust are prevented from reaching the inside of the gimbal through the hollow structure. In this way, the purpose of waterproof and dustproof has been achieved. In this case, the sealing member 3 may only serve the purpose of covering the clearing slot 13 in appearance.

In some exemplary embodiments, the hollow structure includes a motor axle, and the second sealing component includes a rubber and/or silica-gel sealing component. For example, the second sealing component is made of a butyl rubber material.

The second sealing component is used to fill the motor axle. While internal wiring of the motor axle is implemented, water droplets and dust are prevented from reaching a position of an electronic speed control board along the motor axle, and parts that need to be protected are separated, so as to achieve the purpose of waterproof and dustproof.

In this disclosure, the structure of the whole gimbal is compact. Use of the sealing member resolves not only the waterproof and dustproof problem but also the internal wiring problem of the gimbal with an adjustable axle arm. This disclosure has high feasibility, simplicity and efficiency. High dustproof and waterproof requirements are met, while centroid adjustments and balancing of the gimbal may also be implemented for different loads. Moreover, the internal wiring of the adjustable axle arm is properly arranged by means of the bending portion on the coaxial cable, the first electrical connection member, as well as the arm and the base with adhesives for fixing, and the like. Hence, high dustproof and waterproof requirements are met, while centroid adjustments and balancing of the gimbal may also be implemented for different loads.

The following describes some exemplary embodiments of a seventh aspect of this disclosure.

The embodiment of the seventh aspect of this disclosure provides a mobile apparatus, including: a load; a body; and the gimbal according to the embodiment of the sixth aspect, where the base of the gimbal is connected to the body, and the load is located on the gimbal.

Since the mobile apparatus provided in the embodiment of the seventh aspect of this disclosure includes the gimbal, all beneficial effects of the gimbal provided in the sixth aspect are also included herein, and details will not be described again.

In some exemplary embodiments, the mobile apparatus includes a handheld gimbal, a mobile terminal, an unmanned aerial vehicle, an unmanned vehicle, an unmanned watercraft, or a vehicle.

In some exemplary embodiments, the load includes one or more of a camera, a camcorder, a sensor, and a lidar.

In this disclosure, the terms "first", "second", and "third" are intended only for description, and shall not be understood as an indication or implication of relative importance; and the term "plurality" indicates two or more, unless otherwise explicitly defined. The terms "mounted", "connected", "connection", "fixed", and the like should be understood in a broad sense. For example, "connection" may be a fixed connection, a detachable connection, or an integrated connection; and "connected" may be "directly connected" or may be "indirectly connected by using an intermediate medium. A person of ordinary skill in the art may understand specific meanings of these terms in this disclosure based on specific situations.

In the descriptions of this disclosure, it needs to be understood that directions or positional relationships indicated by terms "up", "down", "left", "right", "front", and "rear" are directions or positional relationships based on the accompanying drawings, and are used only for conveniently describing this disclosure and simplifying the descriptions, but do not indicate or imply that an apparatus or unit mentioned must have a specific direction and must be constructed and operated in a specific direction, and therefore cannot be understood as limitations on this disclosure.

In the description of this specification, the description of the terms "an embodiment", "some embodiments", "specific embodiments", and the like means that specific features, structures, materials, or characteristics described with reference to the embodiment(s) or example(s) are included in at least one embodiment or example of this disclosure. In this specification, a schematic representation of the foregoing terms does not necessarily refer to a same embodiment or a same example. In addition, the described specific features, structures, materials, or characteristics may be combined in one or more embodiments or examples in an appropriate manner.

The foregoing descriptions are only preferred embodiments of this disclosure, and not intended to limit this disclosure. For a person skilled in the art, this disclosure may be subject to various changes and variations. Any modifications, equivalent replacements, improvements, and the like made based on this disclosure shall fall within the scope of protection of this disclosure.

What is claimed is:

1. An arm adjustment structure, comprising:
    a base;
    an arm, which is movable relative to the base and includes a clearing slot; and
    a sealing member, which is disposed between the base and the arm, and is configured to locate at the clearing slot to cover the clearing slot,
    wherein
        a first positioning part is disposed on the base,
        a first positioning fitting part corresponding to the first positioning part is disposed on the sealing member, and
        the first positioning part engages with the first positioning fitting part to position the base and the sealing member relative to each other, wherein
            the first positioning part includes a first positioning protrusion disposed on the base, the first positioning fitting part includes a first positioning hole which is disposed on the sealing member and engages with the first positioning protrusion, and the first positioning protrusion is located in the first positioning hole; or
            the first positioning part includes a second positioning hole disposed on the base, the first positioning fitting part includes a second positioning protrusion which is disposed on the sealing member and engages with the second positioning hole, and the second positioning protrusion is located in the second positioning hole.

2. The arm adjustment structure according to claim 1, wherein
    the sealing member is configured to be positioned relative to the base.

3. The arm adjustment structure according to claim 2, wherein
    at least one of the first positioning protrusion or the first positioning hole is sealed by a sealing gasket; or at least one of the second positioning protrusion or the second positioning hole is sealed by a sealing gasket.

4. The arm adjustment structure according to claim 2, wherein
the sealing member is fixed to the base.

5. The arm adjustment structure according to claim 1, wherein
the arm is connected to the base at a location of the arm, wherein the location is adjustable relative to the base; and
the arm includes a clearing slot to provide a clear space for adjusting the location.

6. The arm adjustment structure according to claim 1, wherein
the sealing member is configured to be positioned relative to the arm.

7. The arm adjustment structure according to claim 6, wherein
a second positioning part is disposed on the arm,
a second positioning fitting part corresponding to the second positioning part is disposed on the sealing member, and
the second positioning part engages with the second positioning fitting part to position the arm and the sealing member relative to each other.

8. The arm adjustment structure according to claim 7, wherein
the second positioning part includes a first positioning column disposed on the arm,
the second positioning fitting part includes a first positioning slot which is disposed on the sealing member and engages with the first positioning column, and
the first positioning column is located in the first positioning slot; or
the second positioning part includes a second positioning slot disposed on the arm,
the second positioning fitting part includes a second positioning column which is disposed on the sealing member and engages with the second positioning slot, and
the second positioning column is located in the second positioning slot.

9. The arm adjustment structure according to claim 6, wherein
the sealing member is fixed to the arm.

10. The arm adjustment structure according to claim 1, wherein,
the base includes a base body and a base cover to define a mounting space where the arm is confined.

11. The arm adjustment structure according to claim 10, wherein
the clearing slot is at least partially located in the mounting space, and
the sealing member is at least partially confined in the mounting space.

12. The arm adjustment structure according to claim 1, further comprising:
an electrical connection member that passes through the clearing slot, wherein,
a through hole for the electrical connection member to pass through is disposed on the sealing member.

13. The arm adjustment structure according to claim 1, further comprising:
an electrical connection member including a first electrical connection member,
wherein the first electrical connection member is at least partially positioned relative to the arm.

14. The arm adjustment structure according to claim 13, wherein
the first electrical connection member is fixed to an inner side of the arm.

15. The arm adjustment structure according to claim 13, wherein
the first electrical connection member is at least partially positioned relative to the base.

16. The arm adjustment structure according to claim 15, wherein
the first electrical connection member is fixed to an inner side of the base.

17. The arm adjustment structure according to claim 13, wherein
the electrical connection member includes at least one of an FPC cable, a coaxial cable, or a flexible flat cable.

18. An adjustment method for an arm adjustment structure, comprising:
moving an arm relative to a base to adjust the arm to a preset position relative to the base, wherein
the arm adjustment structure includes the base, the arm which is movable relative to the base and includes a clearing slot, and a sealing member which is disposed between the base and the arm and configured to locate at the clearing slot; and
positioning the sealing member on the arm to cover the clearing slot,
wherein
a first positioning part is disposed on the base,
a first positioning fitting part corresponding to the first positioning part is disposed on the sealing member, and
the first positioning part engages with the first positioning fitting part to position the base and the sealing member relative to each other, wherein
the first positioning part includes a first positioning protrusion disposed on the base, the first positioning fitting part includes a first positioning hole which is disposed on the sealing member and engages with the first positioning protrusion, and the first positioning protrusion is located in the first positioning hole; or
the first positioning part includes a second positioning hole disposed on the base, the first positioning fitting part includes a second positioning protrusion which is disposed on the sealing member and engages with the second positioning hole, and the second positioning protrusion is located in the second positioning hole.

19. A coaxial cable for an arm adjustment structure, comprising:
a coaxial cable body; and
a bending portion connected to the coaxial cable body, wherein
the arm adjustment structure includes a base includes a base body, and an arm movable relative to the base, wherein a clearing slot is disposed on the arm, and
the bending portion bends in a moving direction of the arm relative to the base,
wherein
a first positioning part is disposed on the base,
a first positioning fitting part corresponding to the first positioning part is disposed on the sealing member, and
the first positioning part engages with the first positioning fitting part to position the base and the sealing member relative to each other, wherein the first positioning part includes a first positioning protrusion disposed on the base, the first positioning fitting part includes a first positioning hole which is disposed on the sealing member and engages with the first positioning protrusion, and the first positioning protrusion is located in the first positioning hole; or the first positioning part includes a second positioning hole disposed on the base, the first positioning fitting part includes a second positioning protrusion which is disposed on the sealing member and engages with the second positioning hole, and the second positioning protrusion is located in the second positioning hole.

\* \* \* \* \*